United States Patent
Goel et al.

(10) Patent No.: US 9,466,077 B2
(45) Date of Patent: Oct. 11, 2016

(54) PROPAGATING PROMOTIONAL INFORMATION ON A SOCIAL NETWORK

(75) Inventors: Vinay Goel, Bangalore (IN); Rahul S. Kulkarni, Thane (IN); Subramanya Srikanth Belwadi, Bangalore (IN); Siddartha Naidu, Bangalore (IN); Ramanathan V. Guha, Los Altos, CA (US)

(73) Assignee: Google Inc., Mountain View, CA (US)

( * ) Notice: Subject to any disclaimer, the term of this patent is extended or adjusted under 35 U.S.C. 154(b) by 1149 days.

(21) Appl. No.: 12/495,396

(22) Filed: Jun. 30, 2009

(65) Prior Publication Data
US 2010/0332330 A1 Dec. 30, 2010

(51) Int. Cl.
*G06Q 30/02* (2012.01)

(52) U.S. Cl.
CPC .......... *G06Q 30/0269* (2013.01); *G06Q 30/02* (2013.01); *G06Q 30/0272* (2013.01); *G06Q 30/0275* (2013.01); *G06Q 30/0276* (2013.01)

(58) Field of Classification Search
CPC ................................................. G06Q 30/0269
USPC ....................................................... 705/14.66
See application file for complete search history.

(56) References Cited

U.S. PATENT DOCUMENTS

| | | | |
|---|---|---|---|
| 2008/0189169 A1* | 8/2008 | Turpin et al. .................... | 705/10 |
| 2008/0228537 A1* | 9/2008 | Monfried et al. ................. | 705/7 |
| 2008/0250312 A1 | 10/2008 | Curtis | |
| 2008/0255933 A1* | 10/2008 | Leventhal .............. | G06Q 30/02 705/14.27 |
| 2008/0294607 A1* | 11/2008 | Partovi ................... | G06Q 30/00 |
| 2008/0313256 A1* | 12/2008 | Kanazawa ........... | G06Q 10/107 709/201 |
| 2009/0070219 A1* | 3/2009 | D'Angelo .............. | G06Q 10/10 705/14.56 |
| 2009/0070412 A1* | 3/2009 | D'Angelo .............. | G06Q 10/10 709/203 |

(Continued)

FOREIGN PATENT DOCUMENTS

| | | |
|---|---|---|
| JP | 2008-158924 | 7/2008 |
| JP | 2008-191768 | 8/2008 |

(Continued)

OTHER PUBLICATIONS

Authorized Officer Nora Lindner, Notification Concerning Transmittal of International Preliminary Report on Patentability for Application No. PCT/US2010/040624, dated Jan. 12, 2012, 6 pages.

(Continued)

*Primary Examiner* — David Stoltenberg
(74) *Attorney, Agent, or Firm* — Fish & Richardson P.C.

(57) ABSTRACT

In one implementation, a method for providing information to computer users includes receiving at a server system an indicator of an action performed on a third-party website by a first user of a social network of users. The method can also include creating by the server system first promotional information based upon the received indicator and information associated with the first user of the social network. The method can further include persistently storing by the server system the created first promotional information in a repository of promotional information, wherein the repository stores promotional information associated with a plurality of third-party websites for display to users of a plurality of social networks. The method can additionally include receiving at the server system a request for promotional information to display to a second user of the social network, the second user having an acquaintance relationship with the first user.

20 Claims, 15 Drawing Sheets

(56) References Cited

U.S. PATENT DOCUMENTS

| | | | |
|---|---|---|---|
| 2009/0083134 A1* | 3/2009 | Burckart et al. | 705/14 |
| 2009/0083260 A1 | 3/2009 | Artom et al. | |
| 2009/0119167 A1* | 5/2009 | Kendall et al. | 705/14 |
| 2009/0164323 A1* | 6/2009 | Byrne | G06Q 30/02 705/14.56 |
| 2009/0164641 A1 | 6/2009 | Rogers et al. | |
| 2009/0222348 A1* | 9/2009 | Ransom et al. | 705/14 |
| 2009/0271289 A1* | 10/2009 | Klinger et al. | 705/26 |
| 2011/0093336 A1* | 4/2011 | Calabria | 705/14.53 |

FOREIGN PATENT DOCUMENTS

| | | |
|---|---|---|
| JP | 2008-191979 | 8/2008 |
| KR | 10-2009-0000036 | 1/2009 |
| KR | 10-2009-0051540 | 5/2009 |

OTHER PUBLICATIONS

Korean Examiner Kyoung Hee Hong, International Search Report and Written Opinion for Application No. PCT/US2010/040624, dated Jan. 24, 2011, 9 pages.

"Share This Quick Sharing to My Space, Email, and More!" (dated Apr. 10, 2007) [online] http://web.archive.org/web/2007041002005/http:/www.sharethis.com.

"Add This! Social Bookmark and Feed Button"—Web 2.0 Social Media Optimization (dated Jan. 3, 2007) [online] http://web.archive.org/web/20070103041800/http:/www.addthis.com/index.html.

"Facebook Beacon, the Pandora's Box of Marketing" (dated Nov. 29, 2007) [online] http://www.mpdailyfix.com/2007/11/facebook_beacon_the_pandoras_b.html.

Office Action issued in Australian Application No. 2010266293 on Oct. 13, 2014, 3 pages.

Office Action for Japanese Application No. 2012-518595, mailed May 12, 2014, 8 pages (with English translation).

Office Action issued in Chinese Application No. 2010080028507.8 on May 6, 2014, 16 pages (with English translation).

Office Action issued in Korean Application No. 10-2012-7002601 on Aug. 1, 2016, 20 pages. (with English translation).

* cited by examiner

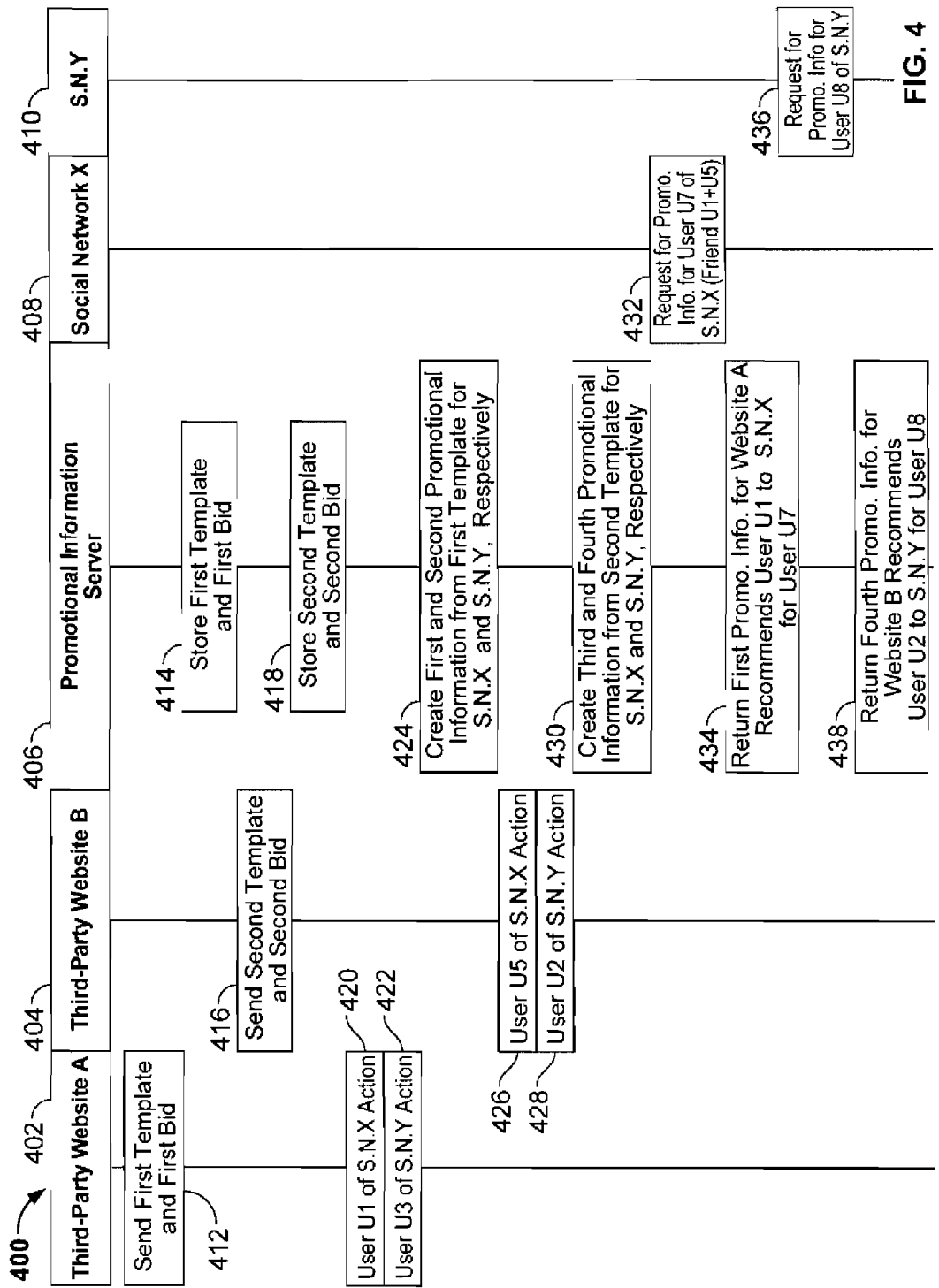

PROPAGATING PROMOTIONAL INFORMATION ON A SOCIAL NETWORK

TECHNICAL FIELD

This document generally describes techniques, methods, systems, and mechanisms for creating and propagating promotional information to users of a social network.

BACKGROUND

The present disclosure generally relates to creating and providing promotional information (e.g., advertising, public service announcements, etc.) to users of a social network (e.g., FACEBOOK, MYSPACE, ORKUT, LINKEDIN, TWITTER, etc.). A social network can be an online system that provides a forum for geographically separated users to interact with one another, where those users have defined a relationship between one another. Users can control who can view their information by identifying particular relationships with other users, and can also find new user from the group of other people who are "friends" of their own friends. Social networks can be aimed at different types of social interaction, such as friendship and business networking. A user of a social network can have a profile page (e.g., a web page on the social network) that provides information about the user to other users of the social network. A profile can include information regarding a user's acquaintance relationships (e.g., friends, colleagues, schoolmates, etc.) on the social network.

Methods of providing promotional information to users of a social network have included targeting a social network and/or users of a social network with specific content from a third-party (e.g., an advertiser). For instance, advertisements have been targeted to users of a social network based upon a general purpose of the social network (e.g., business) and/or content associated with a user's profile page on a social network (e.g., user designated interest in sports).

SUMMARY

This document describes techniques, methods, systems, and mechanisms for creating and propagating promotional information (e.g., advertisements, public service announcements, news, event announcements, etc.) to users of a social network based upon a user activity on a third-party website. In general, a user of a social network may be associated with a stream of activities (an activity stream) that the user has performed (e.g., 12:30 PM—eating lunch, 1:40 PM—search for new shoes on Internet, etc.). The described techniques, methods, systems, and mechanisms relate to capturing activities in a user's activity stream (with the user's consent) that are relevant to a third-party website (e.g., an online retailer, a news outlet, a television station, etc.) and creating promotional information to propagate to users of social networks based on the captured activities.

In one implementation, a computer-implemented method for providing information to computer users includes receiving at a server system an indicator of an action performed on a third-party website by a first user of a social network of users, wherein the third-party website is hosted by a third-party server. The method can also include creating by the server system first promotional information based upon the received indicator from the third-party website and information associated with the first user of the social network, wherein the third-party server is in a system that is separate from the social network and the server system. The method can further include persistently storing by the server system the created first promotional information in a repository of promotional information, wherein the repository stores promotional information associated with a plurality of third-party websites for display to users of a plurality of social networks. The method can additionally include receiving at the server system a request for promotional information to display to a second user of the social network, the second user having an acquaintance relationship with the first user, wherein the acquaintance relationship is defined in a database having information that is available to the server system. The method can also include determining by the server system that the created first promotional information is to be displayed to the second user based upon, at least in part, the acquaintance relationship between the first user and the second user; and transmitting by the server system the created first promotional information for display to the second user of the social network.

In another implementation, a system for propagating promotional information to users of a social network based upon user activity on a third-party website can include one or more servers, and an interface to the one or more servers to receive an indicator of an action performed on a third-party website by a first user of a social network of users, to receive a request for promotional information to display to a second user of the social network, and to transmit promotional information for display to the second user, wherein the first user and the second user have an acquaintance relationship. The system can also include a promotional information creation component to create first promotional information based upon the received indicator from the third-party website and information associated with the first user of the social network, wherein the created first promotional information has fixed dimensions. The system can additionally include a repository to persistently store the created first promotional information, wherein the repository stores promotional information associated with a plurality of third-party websites for display to users of a plurality of social networks. The system can further include a request processing component to, in response to the received request for promotional information, determine the created first promotional information is to be displayed to the second user based upon, at least in part, the acquaintance relationship between the first user and the second user, wherein the created first promotional information is displayed to the second user in a predetermined area of the second user's viewing pane of the social network, wherein the predetermined area has a fixed size.

In another embodiment, a system for propagating promotional information to users of a social network based upon user activity on a third-party website can include one or more servers, and an interface to the one or more servers to receive an indicator of an action performed on a third-party website by a first user of a social network of users, to receive a request for promotional information to display to a second user of the social network, and to transmit promotional information for display to the second user, wherein the first user and the second user have an acquaintance relationship. The system can also include a promotional information creation component to create first promotional information based upon the received indicator from the third-party website and information associated with the first user of the social network, wherein the created first promotional information has fixed dimensions. The system can further include a repository to persistently store the created first promotional information, wherein the repository stores promotional information associated with a plurality of third-party websites for display to users of a plurality of social networks. The system can additionally include means for processing the received request for promotional information by determining that the created first promotional information is to be displayed to the second user based upon, at least in part, the acquaintance relationship between the first user and the second user, wherein the created first promotional information is displayed to the second user in a predetermined area of the second user's viewing pane of the social network, wherein the predetermined area has a fixed size.

Particular embodiments can be implemented, in certain instances, to realize one or more of the following advantages. A third-party website can provide promotional information to users of multiple social networks without having to establish an interface with any of the multiple social networks. A social network can receive promotional information to display to its users from multiple third-party websites without having to establish a separate interface with each of the multiple third-party websites. Activities in a user's activity stream that are relevant to a third-party website can be persistently stored for prominent display (e.g., display near the top of a page of the social network) to other users of the social network. Users of social networks can endorse and recommend content on the internet to their friends, colleagues, neighbors, schoolmates, etc. on a social network. Social networks and third-party websites can use "word of mouth" advertising to spread promotional information to users of social networks.

The details of one or more embodiments are set forth in the accompanying drawings and the description below. Other features, objects, and advantages of the invention will be apparent from the description and drawings, and from the claims.

DESCRIPTION OF DRAWINGS

FIG. 4 is a timeline depicting an example process for creating and propagating promotional information to users of a social network.

Like reference symbols in the various drawings indicate like elements.

DETAILED DESCRIPTION

Figure 1A:
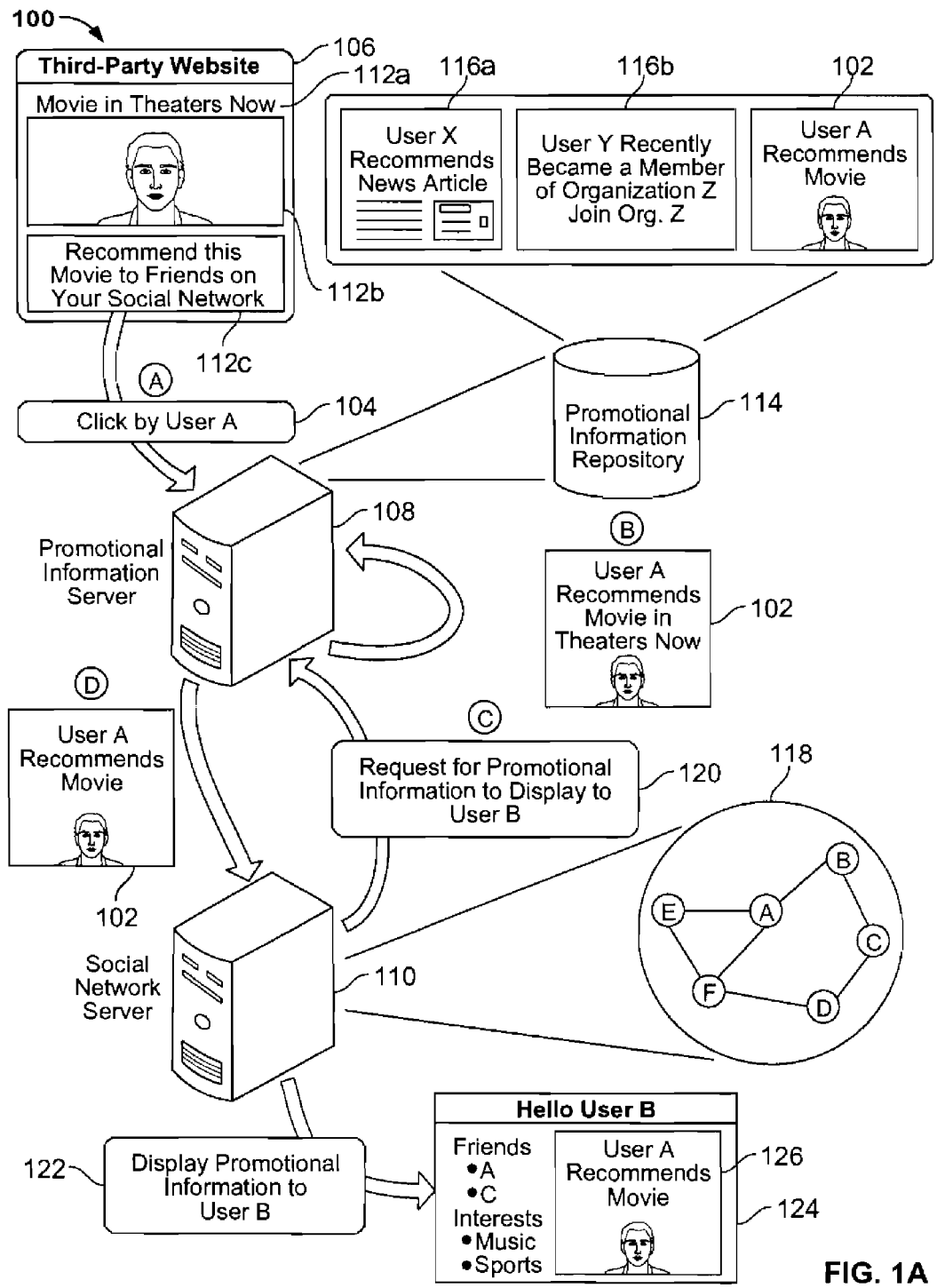
FIGS. 1A-C are conceptual diagrams of example systems for creating and propagating promotional information to users of a social network.

This document generally describes creation and propagation of promotional information on a social network. More specifically, the document describes techniques, methods, systems, and mechanisms for creating promotional information based upon user activity on a third-party website and for propagating the created promotional information to other users of a social network.

For instance, after purchasing a new pair of shoes on a third-party website (e.g., an online shoe store), a user of a social network may be presented with an opportunity (e.g., a button, a link, etc.) to share information regarding the purchase with the user's friends on the social network. If the user elects the opportunity, promotional information (e.g., an advertisement) can be created for the new shoe purchase. Such promotional information can feature an assortment details regarding the purchase, such as a description and image of the shoes, a name and web address for the third-party website, details regarding the purchase (e.g., price, current offers, duration of sale, etc.), the name (e.g., screen name, real name, etc.) of the user that purchased the shoes, a personalized message from the user regarding the purchase (e.g., "I just got a great deal on these shoes. Click here to find out more."), etc. This created promotional information can be stored and displayed to the user's friends on the social network. For example, a friend of the user on the social network may be presented with promotional information regarding the user's shoe purchase when the friend views a page (e.g., the friend's landing page) on the social network.

A promotional information server can be used to create, store, and propagate promotional information from multiple third-party websites to multiple social networks. The promotional information server can act as an intermediary, permitting promotional information from multiple third-party websites to be created and propagated across multiple social networking sites. For example, promotional information can be created and propagated across a social network A and a social network B by the promotional information server based upon user activity (e.g., online shoe purchase, news article reviewed, etc.) on an online shoe store website and/or a news website. Users from the social network A and users from the social network B can elect to share information regarding their activity on the shoe store website and the news website. Based upon these user elections, the promotional information server can generate promotional information and propagate the promotional information to users of the social network A and to users of the social network B.

By connecting a third-party website with multiple social networking sites, the promotional information server can provide a centralized service for the third-party website to distribute promotional information across multiple social networking sites. Furthermore, by connecting a social networking site with multiple third-party websites, the promotional server can provide a centralized service for the social networking site to receive promotional information from multiple third-party websites for display to users of the social network.

Promotional information can be created in a variety of formats (e.g., text, image, video, interactive application, game, etc.) and can be used for a variety of purposes (e.g., product advertisement, public service announcement, news, event announcement (e.g., concert, soccer match), website recommendation, etc.). Prior to the creation of promotional information, a third-party websites can provide the promotional information server with content (e.g., a template) for the promotional information and/or with criteria for displaying the promotional information. For instance, a third-party website may identify to the promotional information server that certain promotional information should be propagated to only users of a social network between the ages of 18 and 35.

A social networking site can request promotional information to display to a user of the social network from the promotional information server. Based upon the request, the promotional information server can select created promotional information for the social network to display. A request made to the promotional information server can include a variety of details, including information regarding a user's acquaintance relationships (e.g., friendship, follower, fan, connection, etc.) with other users on the social network. Using details from the request, the promotional information server can propagate promotional information between users of the social network that have an acquaintance relationship.

For instance, assume a first and a second user of a social network have an acquaintance relationship and that the promotional information server has created an advertisement regarding a purchase made by the first user. When the second user visits a page (e.g., the second user's landing page) on the social network, the social network can request promotional information to display to the second user from the promotional information server. Based upon the second user having an acquaintance relationship, the promotional information server may select the advertisement regarding the first user's purchase to display to the second user.

The promotional information server can also determine which promotional information to display to a user of a social network based upon bids made by third-party websites. A third-party website can bid for the opportunity to display its promotional information to users of a social network. Among a variety of factors that can be considered in selecting promotional information to display to a user, the promotional information server can base its selection, at least in part, on an amount bid by a third-party website. For instance, if an online shoe store bids $0.25 and an online music store bids $0.30 to display an advertisement to a user of a social network, assuming all other things are equal, the promotional information sever may select promotional information from the online music store to display because the music store's bid is greater than the shoe store's bid.

By propagating promotional information based, at least in part, on acquaintance relationships, the promotional information server can create "word of mouth" advertising among users of a social network. Since "word of mouth" advertising is among the most effective forms of advertising, third-party websites may value promotional information created by the promotional information server greater than other forms of advertising. As such, third-party websites may bid greater amounts to display promotional information created by the promotional information server than bids for other forms of advertising.

Users of a social network may be provided with incentives to share their activities on third-party websites for the purpose of creating promotional information. For instance, a user may receive a portion of the revenue generated by the display of promotional information associated with the user (e.g., an advertisement regarding a recent purchase made by the user) on a social network. Additionally, a social network can receive revenue for displaying promotional information to its users.

Figure 1B:
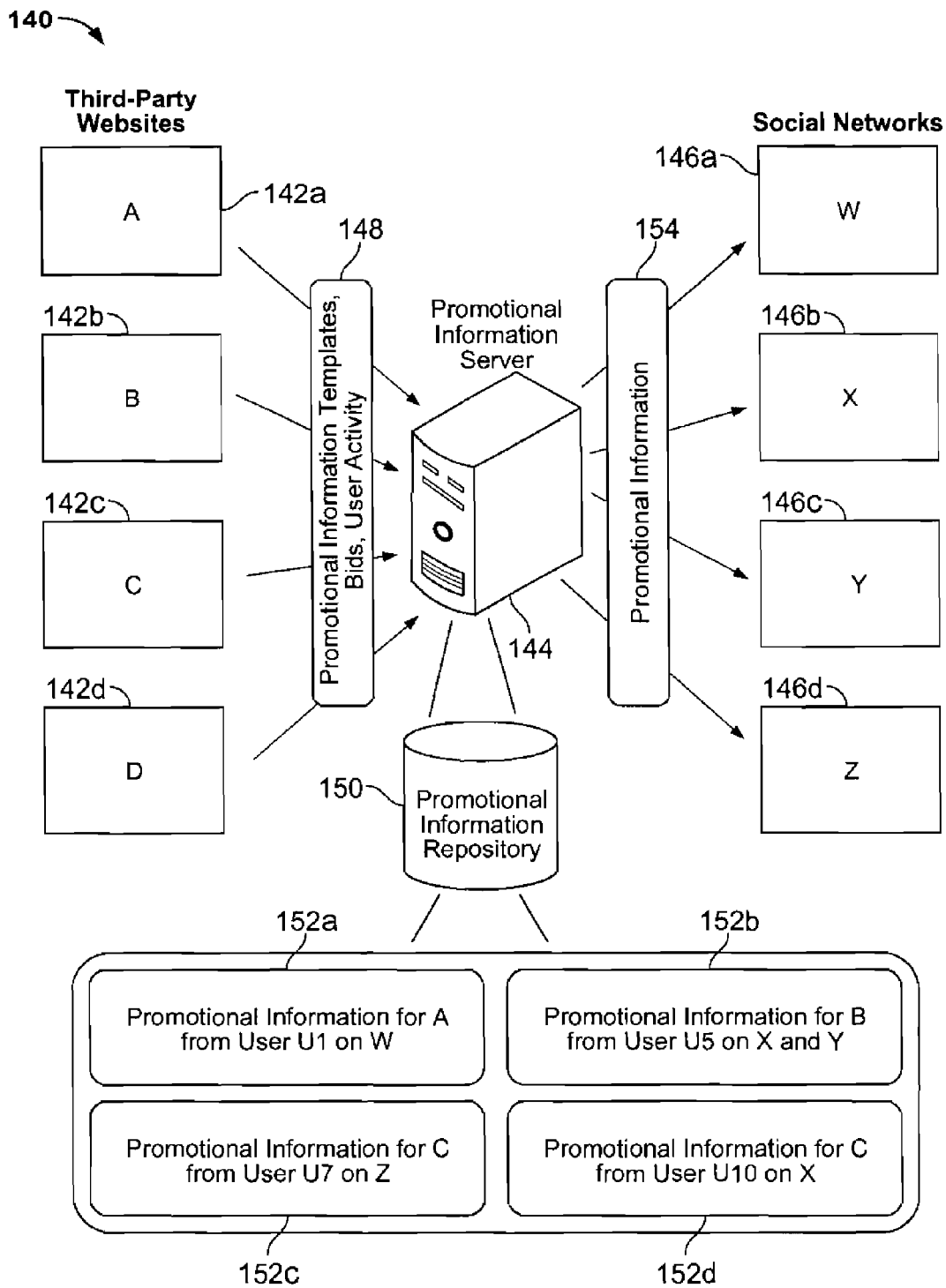
Figure 1C:
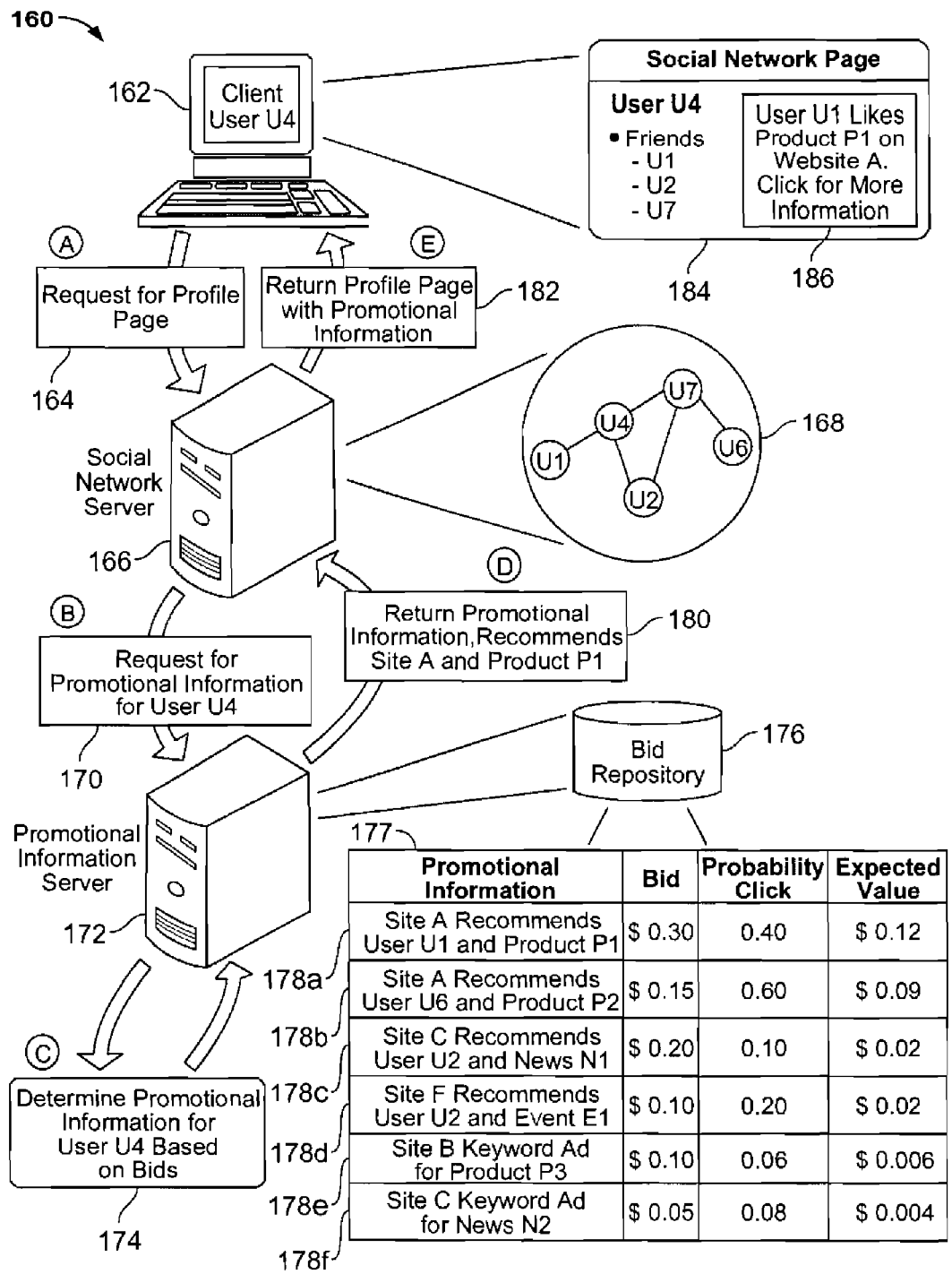

FIGS. 1A-C are conceptual diagrams of example systems for creating and propagating promotional information to users of a social network. FIG. 1A depicts an example system 100 for creating promotional information 102 based upon a user's activity 104 on a third-party website 106 using a promotional information server 108. The example system 100 also depicts propagation of the created promotional information 102 from the promotional information server 108 to other users of a social network server 110.

The third-party website 106 can be any of a wide variety of websites seeking to promote information associated with the website. For example, the third-party website can be an online retailer, a news website, a website distributing media (e.g., YOUTUBE.COM), etc. In the depicted example system 100, the third-party website 106 relates to movies. The website 106 contains a title 112a "Movie in Theaters Now," an image 112b associated with the movie, and a link 112c that a user of a social network can select (e.g., click) to "recommend this movie to friends on your social network."

As shown at step A, the link 112c is clicked 104 by a user A of a social network. The click 104 performed by the user A is an example of user activity on the third-party website 106 that can trigger creation of promotional information. Through code and/or a widget (e.g., an application) embedded in the third-party website 106, information regarding the click 104 (e.g., information identifying the user A and the action performed) by user A is transmitted to the promotional information server 108. In this example, the third-party website 106 can be viewed by user A on a computer (e.g., a desktop computer, a portable computing device, a cell phone, an internet-enabled device (e.g., a television, a gaming console), another server, etc.) separate from the promotional information server 108.

The promotional information server 108 can create the promotional information 102 upon receiving the information regarding user A's activity (click 104) on the third-party website 106, as depicted at step B. Promotional information (e.g., advertisements, news, etc.) can relate to a variety of content (e.g., products, news, events, online media content (videos, blogs, etc.), services, etc.) and can be created in a variety of media formats (e.g., text, image, video, interactive application, game, etc.). In the example depicted, the promotional information 102 includes the image 112b from the third-party website 106 and promotional text that "User A recommends Movie in theaters now."

The promotional information server 108 can create the promotional information 102 from a template provided by the third-party website 106. The template can contain placeholders for information regarding a user (user A) that has performed the action (e.g., consent to promote, product purchase, etc.) on the third-party website 106 which triggered creation of the promotional information 102. For instance, a template from which the promotional information 102 is created could be the image 112b with text "_____ recommends Movie in theaters now," where "_____" is a placeholder for the user's name (e.g., User A).

The promotional information server 108 can store the promotional information 102 in a promotional information repository 114. The promotional information repository 114 can persistently store the promotional information 102 and, upon receiving a request for promotional information from a social network, display the promotional information 102 to other users of the social network. The promotional information 102 can be persistently stored for a duration of time determined by the third-party website 106, the social network server 110, the promotional information server 108, and/or the User A.

By persistently storing the promotional information 102 in the promotional information repository 114, an action from an activity stream associated with the User A that is relevant to the third-party website 106 can be captured for prominent display to other users of the social network. A user's activity stream can be a list of activities associated with the user and/or other users of the social network having an acquaintance relationship with the user. For instance, the User A's activity stream can be a chronological list of postings regarding what User A is doing (e.g., 12:01 PM—eating lunch at a new restaurant, 12:45 PM—back at work, 3:00 PM—User B (friend of User A) is reading breaking news on www.newssite.com, 5:30 PM—shopping for new running shoes on www.website.com, etc.).

Entries in a user's activity stream can be presented in a user's social network page (e.g., a users profile page) in chronological order. The entries can be listed from most recent entry to a least recent entry, with the most recent entries being presented at the top of the steam and the oldest entries being presented at the bottom of the stream. The most recent entry in an activity stream can be described as being the most prominent entry—users visiting a page on a social network that has an activity stream may be more likely to view the most recent entries presented at the top of an activity stream than older entries presented at the bottom of an activity stream. Although an entry in a user's activity stream may be relevant to a third-party website (such as the example entries at 3:00 PM and 5:30 PM presented in the in the previous paragraph), such an entry can be pushed from a position of prominence (e.g., near the top of the activity stream) to a position of less prominence (e.g., near the bottom of the activity stream) as new entries are added to the stream.

By creating the promotional information 102 and persistently storing it in the promotional information repository 114, activity from the User A's activity stream relevant to the third-party website 106 can be captured for prominent display to other users of the social network. The promotional information 102 can be prominently displayed to other users even after the activity has been pushed to the bottom (or off) of the User A's activity stream. For instance, assume the User A's recommendation of the movie 112a appears in the User A's activity stream (e.g., "I recommend Movie") as well as in the activity streams of User A's friends (e.g., "User A recommends Movie") on a Monday. By the next Monday, the entries regarding User A's recommendation of the movie 112a have likely been pushed out of a position of prominence and to the bottom (or off) the activity streams of User A and User A's friends. However, the promotional information 102 that was created and is being persistently stored in the promotional information repository 114 can be continually displayed in a prominent location to the friends of User A, even on the next Monday. Once the promotional information 102 is created it may not correspond to or be affected by the activity stream for User A.

As demonstrated by additional promotional information 116a-b, the promotional information server 108 can create promotional information from actions performed on multiple third-party websites. Additionally, the promotional information repository 114 can persistently store the additional promotional information 116a-b for display to users of the social network. For instance, the promotional information 116a regards a news article recommended by a User X and the promotional information 116b regards membership in an Organization Z that a User Y recently joined.

In addition to creating promotional information based upon actions performed by a user of a social network on a third-party website, the promotional information server 108 can propagate the created and persistently stored promotional information to other users of the social network server 110. The social network server 110 is represented in this example by the social graph 118, which depicts acquaintance relationships among some of the users of the social network server 110. In the social graph 118, each node represents a user (Users A-F) and each vertex connecting two nodes represents an acquaintance relationship among two of the users. For example, User A has acquaintance relationships with Users B, E, and F.

The social network server 110 can send a request for promotional information to display to a user. The social network server 110 can be triggered to send a request in a variety of ways, such as by a user requesting a page of the social network server 110 (e.g., the user's profile page, another user's profile page, a community page, etc.) or in anticipation of a user requesting a page of the social network server 110 (e.g., pre-caching promotional information when users is currently active on the social network).

In various implementations, a request for promotional information can originate from a client computer (e.g., a desktop computer, a laptop, a cell phone, a portable computing device, etc.) that a user is using to view pages of the social network. For instance, a user of the social network may receive a page of the social network having an embedded widget (e.g., application) or code that formulates a request to the promotional information server 108.

In the depicted example, at step C the social network server 110 sends a request 120 for promotional information to display to User B to the promotional information server 108. As depicted in the social graph 118, User B has acquaintance relationships with User A and User C. The social network server 110 can transmit information regarding the acquaintance relationships of User B and/or the characteristics (e.g., age, gender, geographic location, interests, etc.) of User B.

In response to receiving the request 120, the promotional information server 108 can determine which of the promotional information stored in the repository 114 should be displayed to the User B. This determination can be based upon a variety of factors. For example, the determination can be based on which users having acquaintance relationships (e.g., friendship, colleague, relative, etc.) with User B's also have promotional information created and stored in the promotional information repository 114 (e.g., User A). Propagation of promotional information via acquaintance relationships can create "word of mouth advertising" on a social network.

In another example, the determination can be based on whether the User B's characteristics match-up with preferred characteristics specified by a third-party website for a specific promotional information. For instance, if the third-party website 106 specifies that the promotional information 102 should be displayed to users between the ages of 18 and 35, and User B is age 28, then the promotional information may be displayed to User B. In a further example, the determination can be based on a bids made by third-party websites to display created promotional information to users of the social network server 110. For instance, if the third-party website 106 bids $0.20 to display the promotional information 102 to each user of the social network and another third-party website bids $0.15 to display its promotional information, the promotional information server 108 can determine that the promotional information 102 is displayed to User B.

In the depicted example, the promotional information server 108 selects the promotional information 102 created from User A's activity on the third-party website 106 to display to the User B. At step D, the promotional information server 108 returns the promotional information 102 to the social network server 110. The social network server 110 can transmit 122 the received promotional information 102 as part of a page 124 of the social network to the User B for display on a client computer (e.g., e.g., a desktop computer, a laptop, a cell phone, a portable computing device, etc.). The promotional information 102 can be displayed in a prominent location 126 (e.g., near the top of the page) in the transmitted page 124.

In various implementations where the promotional information server 108 received a request from a client computer associated with User B, the promotional information server 108 can return the promotional information 102 to the client computer. In such implementations, the a widget (e.g., application) and/or code embedded in a web page that requested the promotional information 102 can display the promotional information 102 in a prominent location on the page (e.g., near the top of the page).

FIG. 1B depicts an example system 140 for creating promotional information from multiple third-party websites 142a-d using a promotional information server 144 and for propagating the created promotional information to multiple social networks 146a-d. In the example system 140, the promotional information server 144 permits the multiple third-party websites 142a-d to create and display promotional information on the multiple social networks 146a-d based upon user activity without having to directly interface with any of the social networks 146a-d. Additionally, the promotional information server 144 permits the multiple social networks 146a-d to receive and display "word of mouth" advertising to users based upon user activity on any of the multiple third-party websites 142a-d.

Each of the multiple third-party websites 142a-d can transmit information 148 to the promotional information server 144. The information 148 can include promotional information templates (as described above with reference to FIG. 1A), bids to display created promotional information to users of a social network, and/or user activity on the third-party websites 142a-d. An action from a user of any one of the multiple social networks 146a-d on any one of the multiple third-party websites 142a-d can trigger creation of promotional information by the promotional information server 144. The promotional information server 144 can create promotional information for each of the multiple third-party websites 142a-d similar to the creation described above with reference to the third-party website 106 and the promotional information server 108.

Promotional information 152a-d is created by the promotional information server 144 and persistently stored in a promotional information repository 150. For example, the promotional information 152a is created by actions on the third-party website A 142a by user U1 of the social network W 146a. The promotional information 152b is created by actions on the third-party website B 142b by user U5 of the social networks X 146b and Y 146c. The promotional information 152c is created by actions on the third-party website C 142c by user U7 of the social network Z 146d. The promotional information 152d is created by actions on the third-party website C 142c by user U10 of the social network X 146b.

Each of the promotional information 152a-d can be propagated to one or more of the multiple social networks 146a-d. For example, the promotional information 152a is created for user U1 of the social network W 146a and can be propagated to the single social network W 146a. In another example, the promotional information 152b is created for user U5 of the social networks X 146b and Y 146c and can be propagated to the social network X 146b and the social network Y 146c.

Each of the multiple social networks 146a-d can send a request for promotional information to the promotional information server 144 (similar to the request describe above with reference to FIG. 1A). In response, the promotional information server 144 can determine which of the promotional information stored in the repository 150 should be sent to the social networks 146a-d. In addition to the factors discussed above with regard to FIG. 1A, the determination made by the promotional information server 144 can be based on the social network from which the request originated. For instance, the promotional information server 144 may make such a determination by considering promotional information 152b and 152d (which were both created by a user of the social network X 146b) in response to a request from the social network X 146b.

After making the determination, the promotional information server 144 transmits the determined promotional information 154 to the social networks 146a-d. Although the social networks 146a-d are discussed as a group, the social networks 146a-d act independently of each other in sending requests and in receiving promotional information. Similarly, the promotional information server 144 creates promotional information independently for each of the third-party websites 142a-d and processes requests from the social networks 146a-d independently.

Each of the social networks 146a-d can display the received promotional information 154 to users in a similar fashion as described above with regard to FIG. 1A.

FIG. 1C depicts an example system 160 for determining promotional information to display to a user of a social network in based upon bids to display promotional information from third-party websites. As described above with reference to FIG. 1A, a third-party website may submit a bid for an opportunity to display promotional information generated from the third-party's site to users of a social network.

At step A depicted in the example system 160, a client computer 162 for a user U4 of a social network sends a request 164 to a social network server 166 for a profile page (e.g., profile page of user U4). The social network server 166 can process and maintain at least a portion of the social network of which user U4 is a member. The social network can be represented by a social graph 168, similar to the social graph 118. As depicted in the example social graph 168, the user U4 has acquaintance relationships with users U1, U2, and U7.

At sep B, the social network server 166 can send a request 170 to a promotional information server 172 for promotional information to display to the user U4 as part of the requested profile page. At step C, the promotional information server 172 can make a determination 174 of the promotional information to display to user U4 based on bids received from third-party websites.

The bids received from the third-party websites can be stored in a bid repository 176. As depicted in a table 177 of bids 178a-f, the bid repository 176 can store a variety of information regarding received bids, such as a third-party website associated with the promotional information, a social network associated with the promotional information, a user associated with the promotional information, a bid amount from the associated third-party website, a click probability for the promotional information, and/or an expected value for the promotional information. The association between promotional information and a third-party website, a user, and a social network can be established when the promotional information is created (e.g., promotional information is created by a user of a social network performing an action on a third-party website).

The bid amount can be received from a third-party website. The bid amount can pertain to an amount the third-party website is willing to pay each time promotional information for the third-party website is clicked and/or viewed. The third-party website may provide a variable scale for the bid amount. For example, a third-party website may specify that for promotional information regarding an event to occur in the near future, the bid amount should increase by 10% every week until the date of the event. The bid amount may also be coupled with a budget for the promotional information. The budget may be periodic (e.g., monthly budget) or it may be an overall budget (e.g., once the budget is exhausted the promotional information is no longer shown to users). The budget can pertain to each created promotional information or collectively to a group of promotional information created from a single template.

The click probability can be a probability that a user viewing the promotional information will click on the promotional information. The click probability can be a number generated by the promotional information server 172 and/or the social network server 166 based upon empirical data (e.g., previous click rate of the promotional information, previous click rate of similar promotional information, etc.). The expected value can be the bid amount multiplied by the click probability and can represent an amount of revenue that is expected if the promotional information is displayed to a user.

The promotional information server 172 can determine which of the promotional information 178a-f to display to the user U4 based on the user U4's acquaintance relationships and the expected value for each of the promotional information 178a-f. Based on the user U4 having acquaintance relationships with users U1, U2, and U7, the promotional information server 172 may consider the promotional information 178a (created from user U1's actions on site A regarding a product P1), the promotional information 178c (created from user U2's actions on site C regarding news N1), and the promotional information 178d (created from user U2's actions on site F regarding an event E1).

When making the determination 174, the promotional information server 172 may also consider other promotional information not created from user activity on a third-party website. For instance, the promotional information server 172 may consider promotional information with a bid based upon a keyword. The promotional information server 172 can make the determination by awarding an opportunity to display promotional information to user U4 to the promotional information with the greatest expected value, regardless of how the type of promotional information (e.g., created by user activity on a third-party website, keyword, etc.). In the depicted example, the promotional information 178d and the promotional information 178e are keyword-based.

Presented for illustrative purposes, the click probability for the promotional information 178a-d (created by user activity on a third-party website) is greater than the click probability for the promotional information 178e-f (keyword-based). A user may be more likely to click on the promotional information 178a-d than on the promotional information 178e-f based on an acquainted user recommending and/or endorsing the promotional information 178a-d.

Based on the expected value for the promotional information being considered (promotional information 178a and 178c-f) by the promotional information server 172, the promotional information 178a is selected. At step D, the promotional information server 172 returns 180 the selected promotional information 178a to the social network server 166. At step E, the social network server 166 returns 182 the requested profile page including the promotional information 178a to the client 162. The client 162 displays the received profile page 184 to the user U4 with the promotional information 178a displayed in a prominent location 186 near the top of the page.

Figure 2:
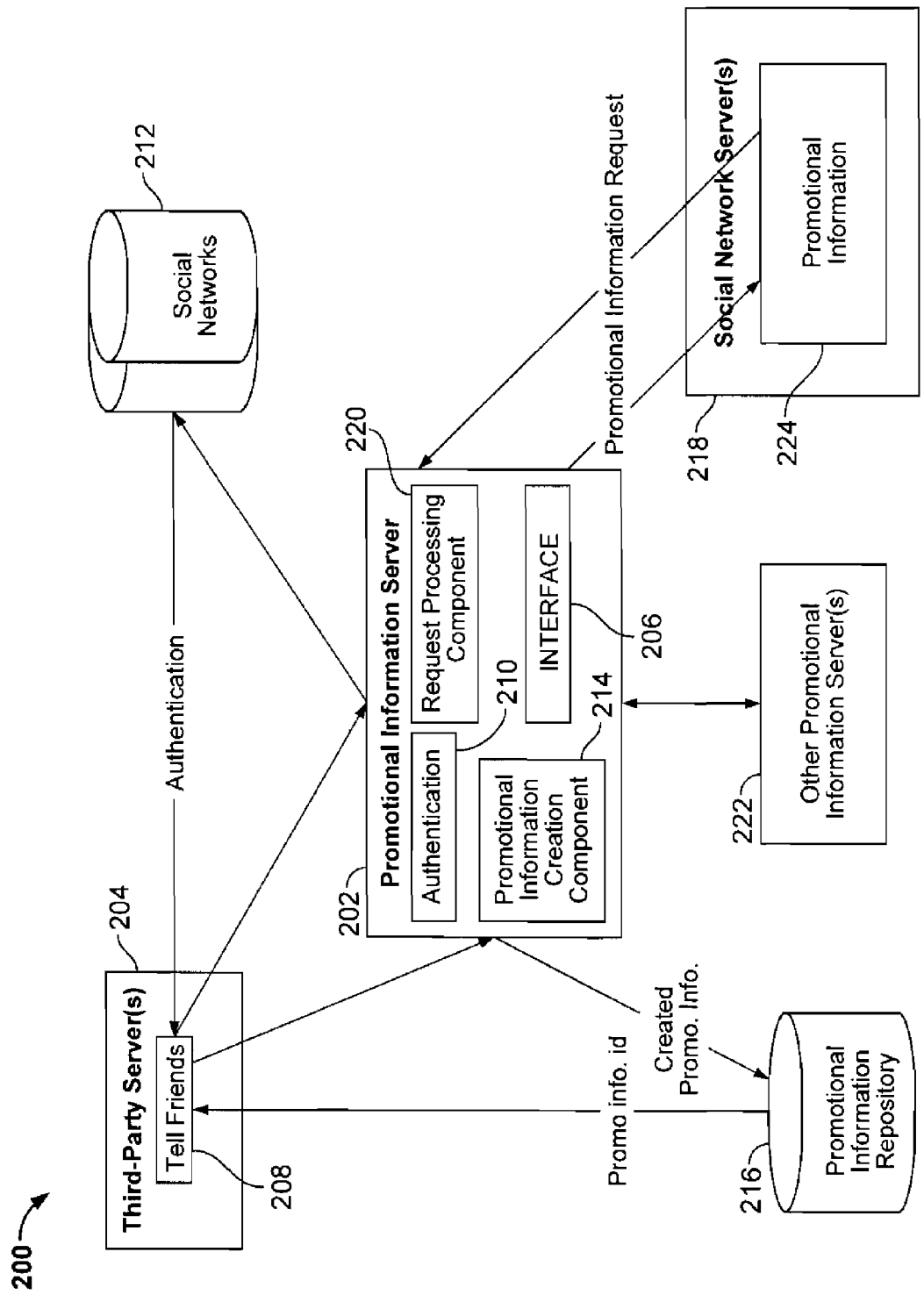
FIG. 2 is a diagram of an example system for creating and propagating promotional information to users of a social network.

FIG. 2 is a diagram of an example system 200 for creating and propagating promotional information to users of a social network. The system 200 is similar to the systems 100, 140, and 160 discussed above with regard to FIGS. 1A-C. The system 200 includes a promotional information server 202 that creates and propagates promotional information based upon user activity on a third-party websites. The promotional information server 202 can be any of a variety of server systems, such as a dedicated server system, a distributed server system, a collocated server system, etc.

To create promotional information, the promotional information system 202 interacts with third-party servers 204 over a network (e.g. a LAN, a WAN, the Internet, an intranet, a wireless connection, etc.). The promotional information system 202 receives information from the third-party servers 204 via an input/output (I/O) interface 206 regarding websites hosted by the third-party servers 204 for which promotional information should be created. As described above with regard to FIGS. 1A-C, the information can include, among other things, a template for the promotional information, an associated bid, and/or criteria (e.g., user characteristics, social network requirements, etc.) for displaying the promotional information to users of a social network.

Upon receiving a webpage designated for creation of promotional information, a user of a social network at a client computer (e.g., laptop, desktop computer, cell phone, PDA, etc.) (not depicted), can perform an activity that triggers creation of the promotional information. As an example, the third-party server presents a "Tell Friends" button 208 that can be contained in a web page and selected by a user. Upon selecting the "Tell Friends" button 208, the user's identity is authenticated by interfacing over the network with an authentication module 210 on the promotional information server 202 and a repository 210 of user identity information for the social networks.

Once authenticated, information regarding the user (e.g., an identifier for the user, the user's social network, the user's name, etc.) can be transmitted to the promotional information creation component 214 on the promotional information server 202. The promotional information creation component 214 can create promotional information regarding the user and the action performed by the user on a website of the third-party server 204. For example, the promotional information creation component 214 can insert information regarding the user into a template previously provided to the promotional information server 202 by the third-party server 204.

The created promotional information regarding the user can be sent, in some implementations over the network, to a promotional information repository 216 for persistent storage. An identifier for the created promotional information can be transmitted from the repository 216 to the third-party server 204.

The created promotional information can be propagated to users of the social network when one of the multiple social network servers 218 sends a request over the network to the promotional information server 202. The social network server 218 can send the request as part of preparing a page of the social network for a display to a user of the social network. The request from the social network server 218 can be received and processed by a request processing component 220. The request processing component 220 can select a created promotional information from the promotional information repository 216 based upon a variety of factors, as discussed above with regard to FIGS. 1A-C. Additionally, the request processing component 220 can query other promotional information servers 222 for other promotional information (e.g., keyword based promotional information) when making a selection. In some implementations, the selection can be based on bids received for the promotional information.

Once the request processing component 220 has selected a promotional information to display to a user associated with the social network server 218, the promotional information server 202 can return the promotional information 224 to the social network server 218.

Figure 3A:
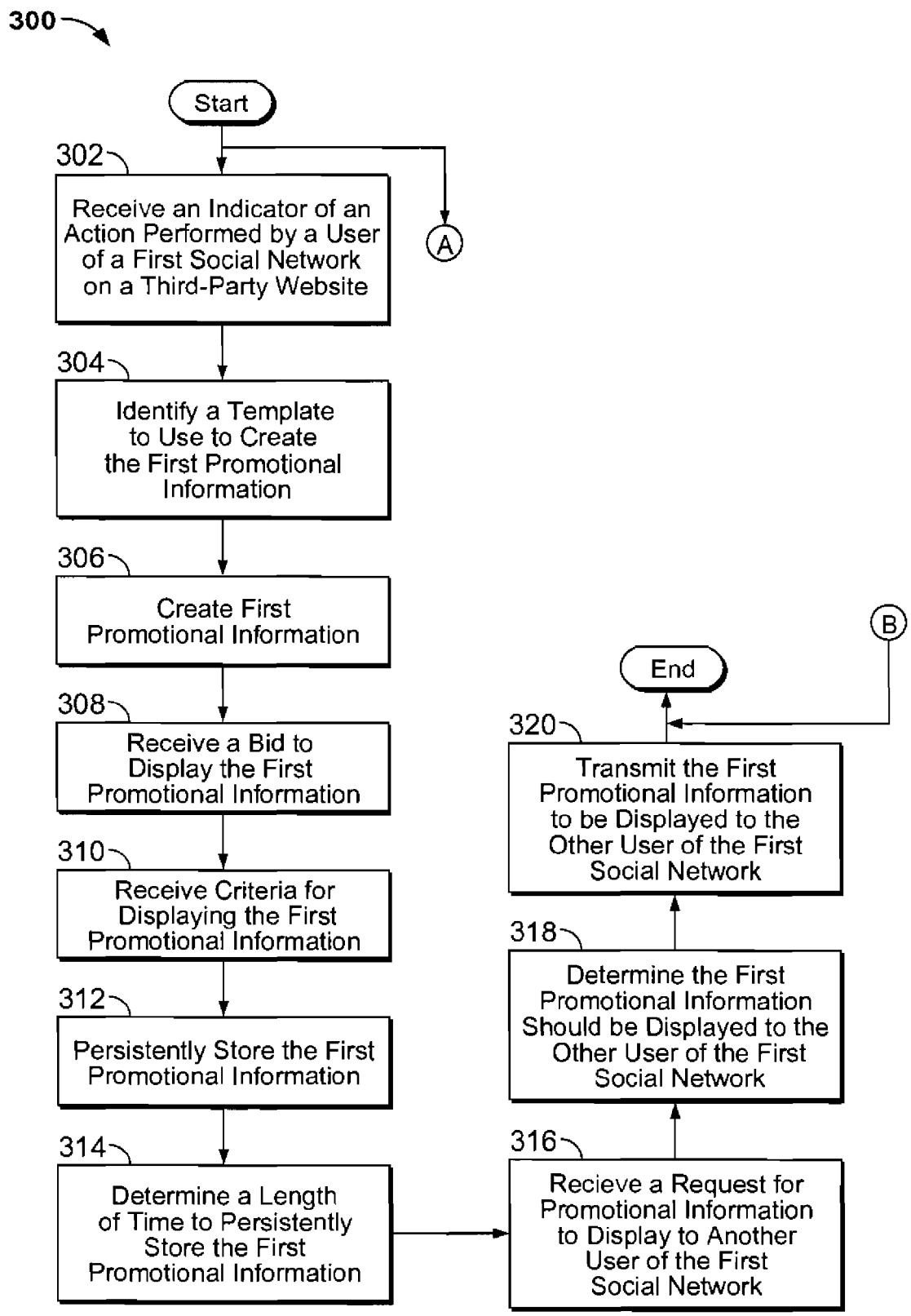
FIGS. 3A-D are flowcharts showing example techniques to create and propagate promotional information to users of multiple social networks.
Figure 3B:
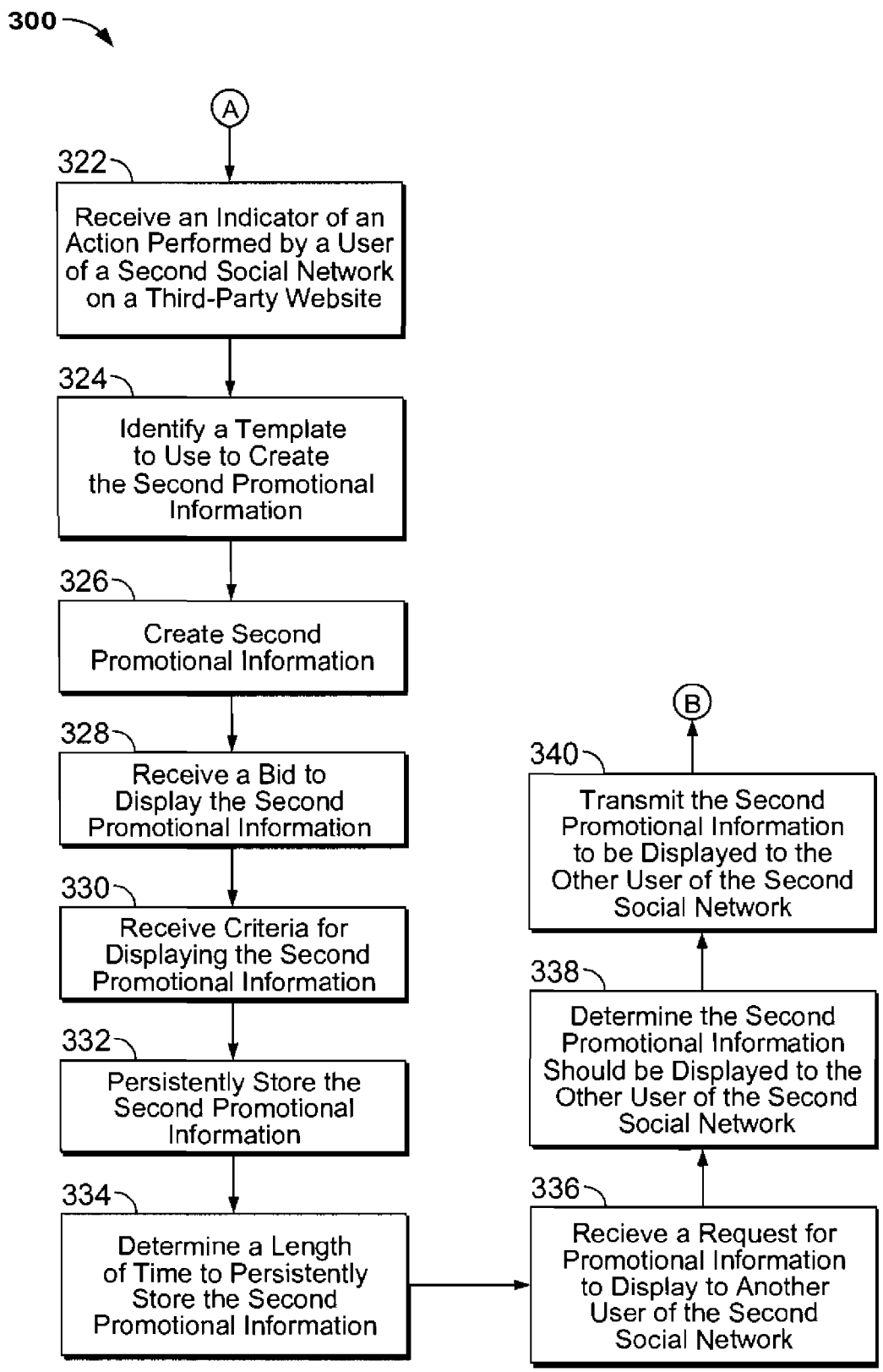

FIGS. 3A-D are flowcharts showing example techniques to create and propagate promotional information to users of multiple social networks. FIGS. 3A-B depict an example technique 300 for creating an propagating promotional information to users of multiple social networks. The technique 300 is presented from a perspective of a promotional information server, such as promotional information servers 108, 144, 166, and 172.

At step 302, an indicator of an action performed on a third-party website by a first user of a first social network of users is received. The indicator can be used to identify a promotional information template from a plurality of promotional information templates (step 304). The promotional information template can include predetermined content (e.g., an image, a message, etc.) and a placeholder for content associated with the first user (e.g., name of the first user).

At step 306, first promotional information is created based upon the received indicator from the third-party website and information associated with the first user of the first social network. A bid to display the created first promotional information and user criteria (e.g., geographic location, age, etc.) for displaying the first promotional information to other users of the first social network can be received from the third-party website (steps 308 and 310). The created first promotional information can be persistently stored (step 312) for a length of time determined by the third-party website (step 314).

At step 316, a request can be received for promotional information to display to another user of the first social network. The first promotional information can be determined to be displayed to the other user of the first social network (step 318). The determination can be based upon a variety of factors, such as characteristics of the other user in relation to the received criteria from the third-party website, the received bid from the third-party website for the first promotional information in relation to bids for other promotional information, an acquaintance relationship between the first user and the other user, etc. At step 320, the first promotional information can be transmitted to the first social network for display to the other user.

The steps 302-320 correspond creating the first promotional information for the first user from the first social network. Steps 322-340 correspond to creating second promotional information for a second user of a second social network. The steps 302-320 and the steps 322-340 can be performed concurrently. Although not presented, additional concurrent steps for additional social networks and/or additional third-party websites can be included. For example, the promotional information server 144 described above with regard to FIG. 1B can create and propagate promotional information for multiple third-party websites and multiple social networks.

At step 322, an indicator of an action performed on a third-party website by a second user of a second social network of users is received. The indicator can be used to identify a promotional information template from a plurality of promotional information templates (step 324). The promotional information template can include predetermined content (e.g., an image, a message, etc.) and a placeholder for content associated with the second user (e.g., name of the second user).

At step 326, second promotional information is created based upon the received indicator from the third-party website and information associated with the second user of the second social network. A bid to display the created second promotional information and user criteria (e.g., geographic location, age, etc.) for displaying the second promotional information to other users of the first social network can be received from the third-party website (steps 328 and 330). The created second promotional information can be persistently stored (step 332) for a length of time determined by the third-party website (step 334).

At step 336, a request can be received for promotional information to display to another user of the second social network. The second promotional information can be determined to be displayed to the other user of the second social network (step 338). The determination can be based upon a variety of factors, such as characteristics of the other user in relation to the received criteria from the third-party website, the received bid from the third-party website for the second promotional information in relation to bids for other promotional information, an acquaintance relationship between the second user and the other user, etc. At step 340, the second promotional information can be transmitted to the second social network for display to the other user.

Figure 3C:
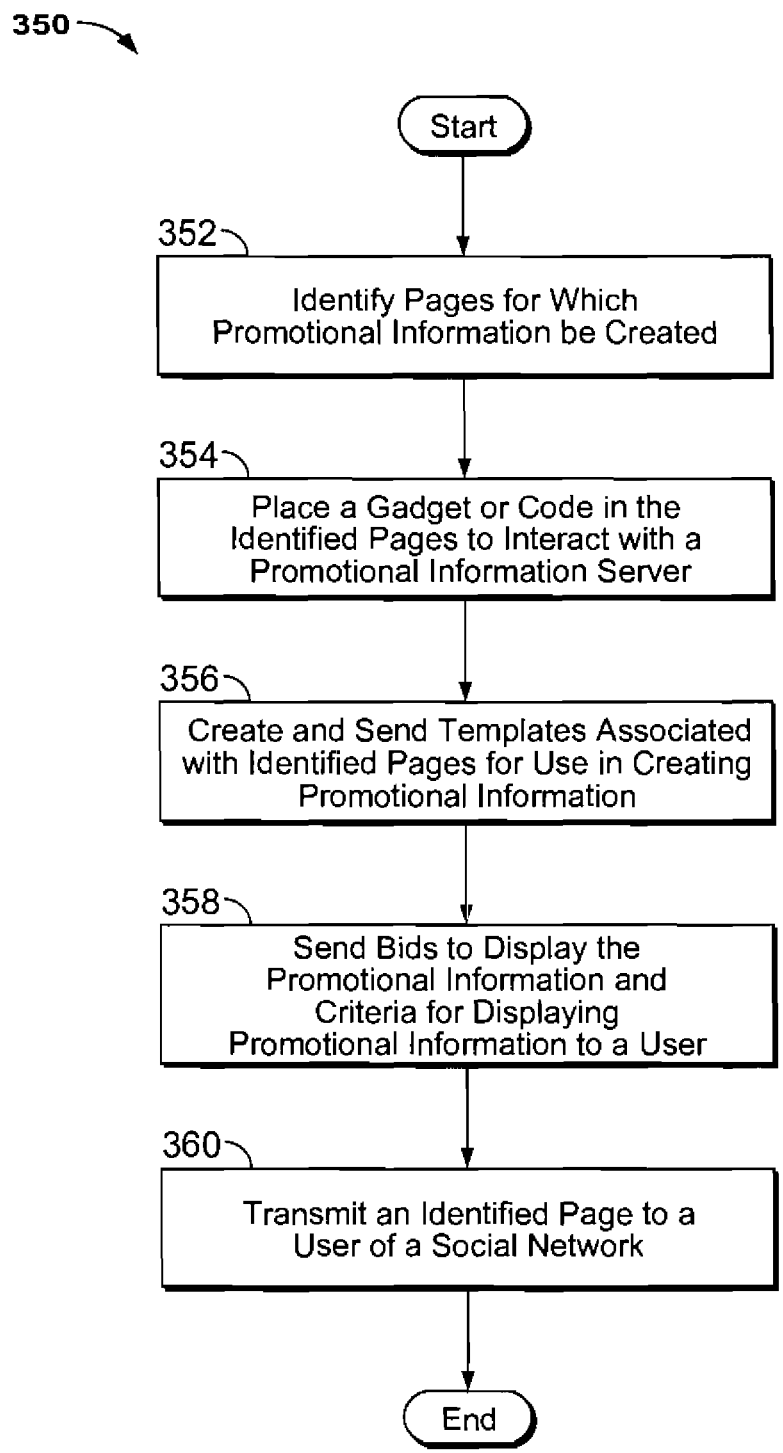

FIG. 3C depicts an example technique 350 for creating and propagating promotional information to users of multiple social networks from the perspective of a third-party website. The technique 350 can be performed by any of a variety of third-party websites, such as third-party websites 106, 142a-d, and 204.

At step 352, pages for which the creation and propagation of promotional information to users of multiple social networks is desired are identified. A gadget (e.g., an embedded application) and/or code are inserted into the identified pages to permit interaction with a promotional information server (step 354). Interaction with the promotional information server can be performed by a client computer that has received and is executing on of the identified pages.

At step 356, templates for the promotional information server to use for creating promotional information are created and sent to the promotional information server. Bids to display promotional information associated with the identified pages to users of a social network and user criteria (e.g., age, geographic location, gender, etc.) for displaying created promotional information are sent to the promotional information server (step 358). An identified page is transmitted to a user of a social network (step 360). Based on the user's interaction with the transmitted page, promotional information can be generated for persistent storage on the promotional information server and future display to other users of a social network.

Figure 3D:
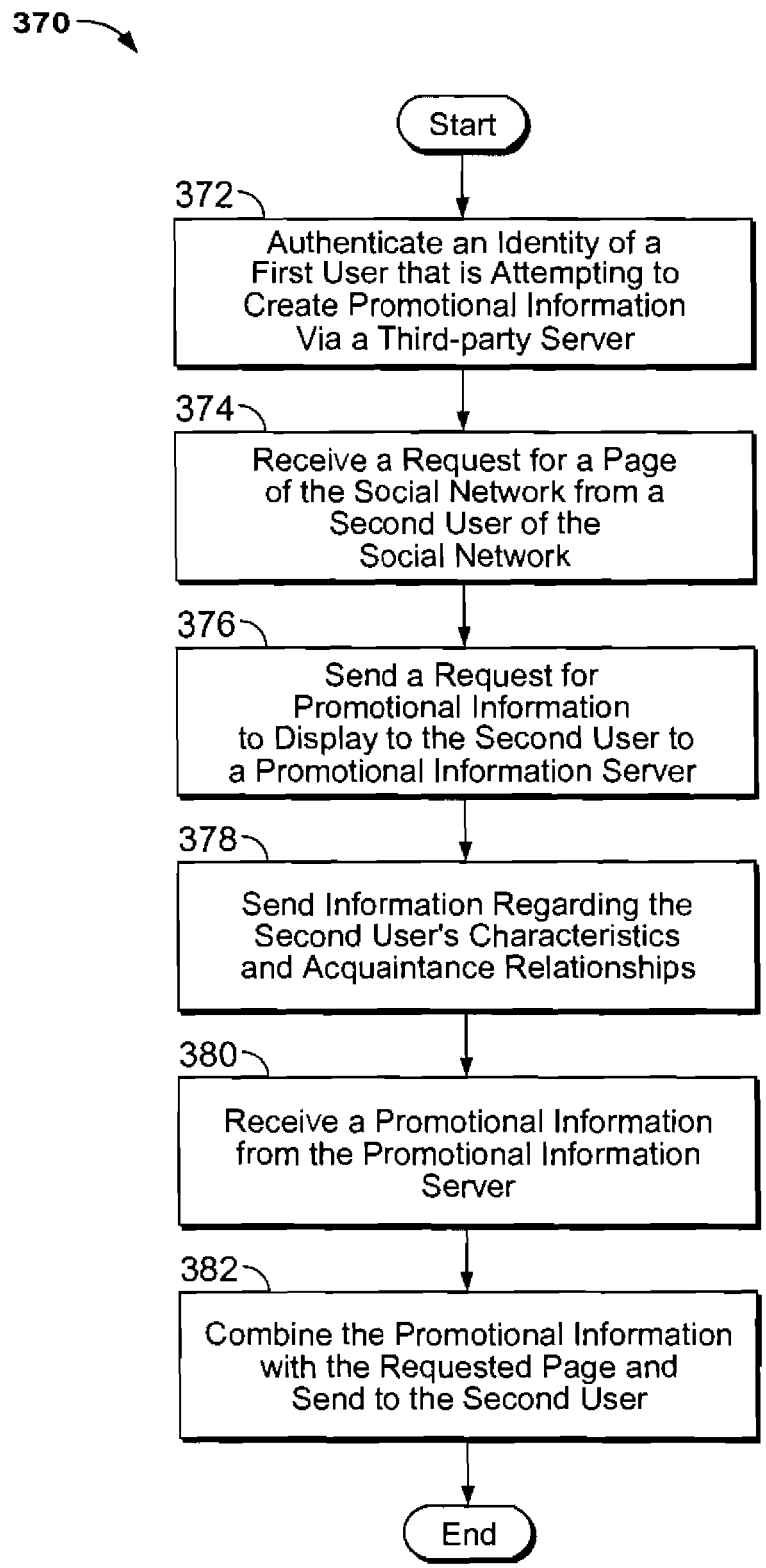

FIG. 3D depicts an example technique 370 for creating and propagating promotional information to users of multiple social networks from the perspective of a social network server. The technique 370 can be performed by any of a variety of social network servers, such as social network servers 110, 146a-d, 166, and 224.

At step 372, an identity of a first user of the social network that is attempting to create promotional information via a third-party server is authenticated. A request for a page (e.g., user profile page, community page, etc.) of the social network from a second user of the social network is received (step 374). In response to the page request, a request for promotional information to display to the second user is sent to a promotional information server (step 376). In addition to sending the request for promotional information, information regarding characteristics (e.g., age, interests, geographic location, etc.) and acquaintance relationships (e.g., friends, colleagues, neighbors, schoolmates, etc.) of the second user can be sent to the promotional information server (step 378).

At step 380, promotional information to display to the second user is received from the promotional information server. The received promotional information can be added to the requested page as the requested page is transmitted to the second user (step 382).

FIG. 4 is a timeline 400 depicting an example technique for creating and propagating promotional information to users of a social network. The example technique demonstrates the creation and propagation of promotional information using multiple third-party websites and multiple social networks. The multiple third-party websites include a third-party website A 402 and a third-party website B 404. A promotional information server 406 can be connected to the third-party websites A 402 and B 404 over a network. The multiple social networks include a social network X 408 and a social network Y 410. The social networks X 408 and Y 410 can be connected to the promotional information server 406 over a network as well.

At time 412, the third-party website A 402 sends a first promotional information template and an associated first bid to the promotional information server 406. At time 414, the promotional information server 404 stores the first template and the associated first bid in anticipation of creating promotional information based on the first template and propagating the created promotional information using the first bid.

At time 416, the third-party website B 404 sends a second promotional information template and an associated second bid to the promotional information server 406. At time 418, the promotional information server 404 stores the second template and the associated second bid in anticipation of creating promotional information based on the second template and propagating the created promotional information using the second bid.

User U1 of the social network X 408 performs an action on the third-party website A 402, at time 420, and the user U3 of the social network Y 410 performs an action on the third-party website A 402, at time 422. In the depicted example, the actions performed by users U1 and U3 are associated with the first template. The third-party website A 402 sends the promotional information server 406 information (e.g., identify of the user performing the action, the action performed, identification of the first template, etc.) regarding the performance of these actions.

At time 424, the promotional information server 406 creates first promotional information from the first template for the action performed by user U1 of the social network X 408. The promotional information server 406 also creates second promotional information from the first template for the action performed by user U3 of the social network Y 410. The first and second promotional information may differ with regard to information identifying users U1 and U3 that is inserted into the first template.

User U5 of the social network X 408 performs an action on the third-party website B 404, at time 426, and the user U2 of the social network Y 410 performs an action on the third-party website B 404, at time 428. In the depicted example, the actions performed by users U5 and U2 are associated with the second template. The third-party website B 404 sends the promotional information server 406 information (e.g., identify of the user performing the action, the action performed, identification of the first template, etc.) regarding the performance of these actions.

At time 430, the promotional information server 406 creates third promotional information from the second template for the action performed by user U5 of the social network X 408. The promotional information server 406 also creates fourth promotional information from the second template for the action performed by user U2 of the social network Y 410. The third and fourth promotional information may differ with regard to information identifying users U5 and U2 that is inserted into the second template.

To summarize, at the end of time 430 the promotional information server 406 has created first, second, third, and fourth promotional information. Created from the first template, the first and second promotional information are directed to the same content but for different users (users U1 and U3) on different social networks (social networks X and Y). Similarly, the third and fourth promotional information are directed to the same content but for different users (users U5 and U2) on different social networks (social networks X and Y).

For example, assume that the third-part website A 402 is an online shoe retailer, the third-party website B 404 is an online news site, the social network X 408 is a social network directed to friendship (e.g., FACEBOOK, ORKUT, etc.), and the social network Y 410 is a social network directed to business networking (e.g., LINKEDIN, etc.). The first and second promotional information can be advertisements for a shoe being sold on the online shoe retailer site. The first promotional information can include a recommendation of the shoe by user U1 directed to other users of the friendship network (e.g., "User U1 recommends this shoe—check it out at the online shoe retailer"). The second promotional information can include a recommendation the shoe by user U3 directed to other users of the business network (e.g., "User U3 recently purchased this shoe—buy a pair today at the online shoe retailer"). The third and fourth promotional information can promote a news article on the news site. The third promotional information can include a recommendation of the news article by the user U5 to other users of the friendship network (e.g., "User U5 thinks this news article is interesting—click here to read it now"). The fourth promotional information can include a recommendation of the news article by the user U2 to other users of the business network (e.g., "Colleagues, this news article contains some valuable insight into the current state of the economy—User U2").

At time 432, the social network X 408 sends a request to the promotional information server 406 for promotional information to display to a user U7 of the social network X 408. In this example, the user U7 has acquaintance relationships with both users U1 and U5 on the social network X 408. At time 434, the promotional information server 406 determines that, of the first promotional information (user U1 and third-party website A 402) and the third promotional information (user U5 and third-party website B 404), the first promotional information should be displayed to the user U7. As described above with regard to FIGS. 1A-C, this determination can be made based upon a variety of factors, including bids received from the third-party websites A 402 and B 404, and characteristics of the user U7. Once a determination is made, the first promotional information can be returned by the promotional information server 406 to the social network X 408 for display to the user U7.

For example, the promotional information server 406 can decide to display the first promotional information to the user U7 based on a bid from the third-party website A 402 exceeding a bid from the third-party website B 404. The bids from the third-party websites A 402 and B 404 can be generally applicable to all social networks or specifically tailored for the social network X 408.

At time 436, the social network Y 410 sends a request to the promotional information server 406 for promotional information to display to a user U8 of the social network Y 410. In this example, the user U8 has acquaintance relationships with both users U3 and U2 on the social network Y 410. At time 438, the promotional information server 406 determines that, of the second promotional information (user U3 and third-party website A 402) and the fourth promotional information (user U2 and third-party website B 404), the fourth promotional information should be displayed to the user U8. Once a determination is made, the fourth promotional information can be returned by the promotional information server 406 to the social network Y 410 for display to the user U8.

Even though the first and third promotional information are similar (derived from the first template from third-party website A 402) and the second and fourth promotional information are similar (derived from the second template from third-party website B 404), the determination made by the promotional information server 406 can vary (e.g., promotional information created from the first template of the third-party website A 402 will not always be selected over promotional information created from the second template of the third-party website B 404). As described above with regard to FIGS. 1A-C, the determination can depend on a variety of factors. For instance, the user U8 may have characteristics (e.g., age, gender, interests, etc.) that the third-party website B 404 and that the user U7 lacks. In another example, the third-party website B 404 may have bid more to display promotional information to users of the social network Y 410 than to users of the social network X 408 (e.g., the third-party website B 404 is a business journal and social network Y 410 is directed toward a business networking). In a further example, by time 438 a budget and/or timeframe for displaying promotional information from the third-party website A 402 may have been exhausted.

Figure 5A:
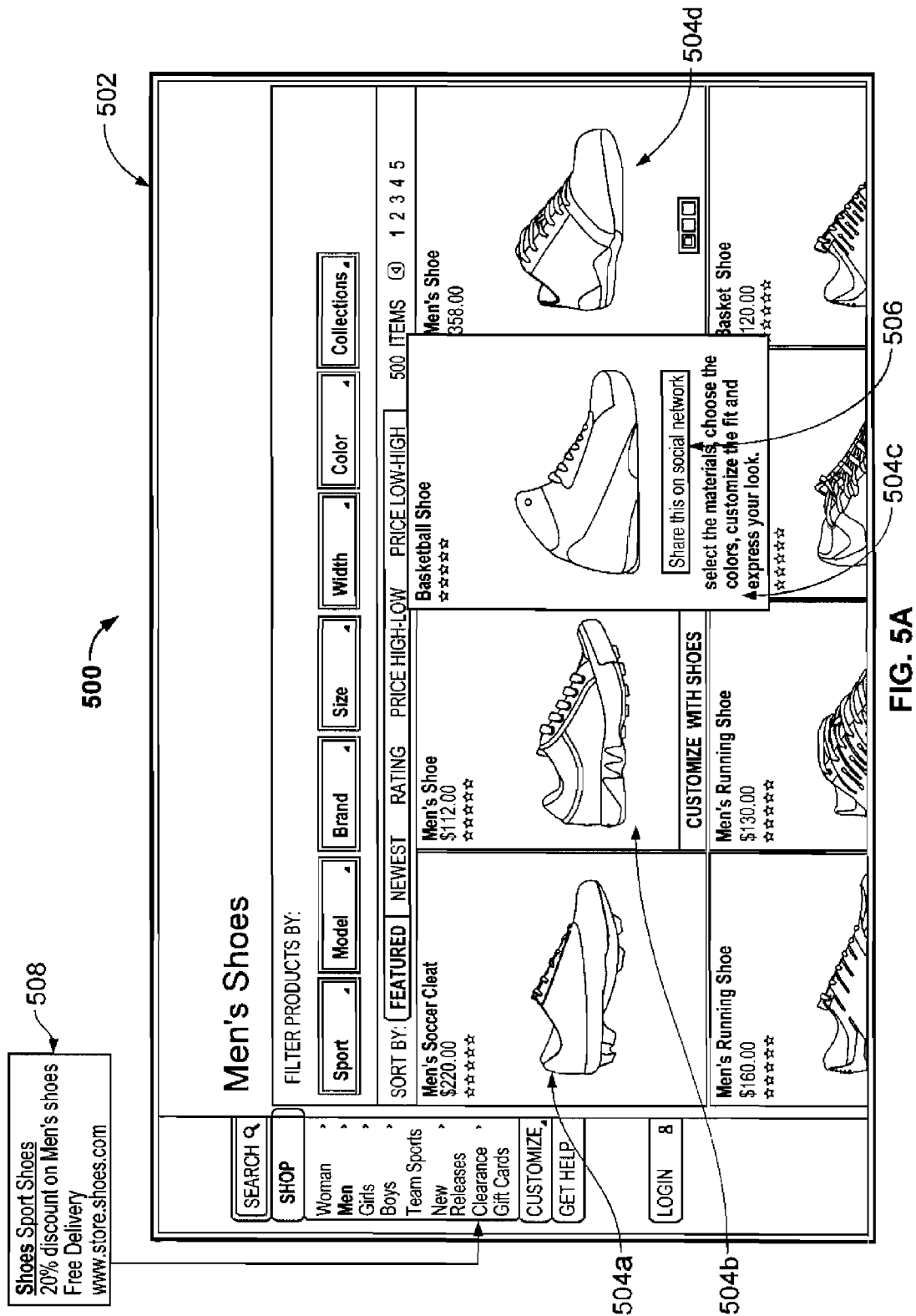
FIGS. 5A-E are screenshots of an example program for creating promotional information based upon user activity on a third-party website and for propagating created promotional information to users of a social network.

FIGS. 5A-E are screenshots of an example program for creating promotional information based upon user activity on a third-party website and for propagating created promotional information to users of a social network. FIG. 5A depicts a screenshot 500 of an example website 502 (e.g., a third-party website) of an online shoe retailer that can be displayed to a user of a social network. The website 502 depicts shoes 504*a-d* as being available for purchase. The shoe 504*b* includes a link 506 that a user can select to share information regarding the shoe with other users of any of a variety of social networks. As depicted in the link 506, information regarding the shoe 504*b* can be shared across multiple social networks.

As depicted in the example, a user may have been directed to the website 502 based on other promotional information 508 for the website 502. For instance, the promotional information 508 may have appeared along side search results for a query "online shoe retailer." By using a promotional information server (such as the promotional information server 108, 144, 166, described above) to create and propagate promotional information to other users of a social network based on a user's activity on the website 502, the impact of the other promotional information 508 may exponentially expand to other users of a social network.

For instance, assume a first user is directed to the website 502 based on the promotional information 508 displayed as part of the results for a search engine query. Also assume that, by selecting the link 506, promotional information regarding the shoe 504*c* is created for the first user and propagated to twenty of the first user's friends on a social network. If fifteen percent of the first user's twenty friends viewing the promotional information (three friends—a second user, a third user, and a fourth user) visit the website 502 and also select the link 506, then additional promotional information can be created for the second user, the third user, and the fourth user. This additional promotional information can then be displayed to friends of the second user, the third user, and the fourth user. If the additional promotional information is displayed to twenty friends of each the second user, the third user, and the fourth user, then the total number of impressions of the promotional information will have increased from one (promotional information 508 displayed to the first user) to twenty (promotional information created from the first user's activity on the website 502 and displayed to twenty of the first user's friends) to sixty (promotional information created from the second, third, and fourth users' activity on the website 502 and displayed to twenty friends of each the second, third, and fourth users).

Figure 5B:
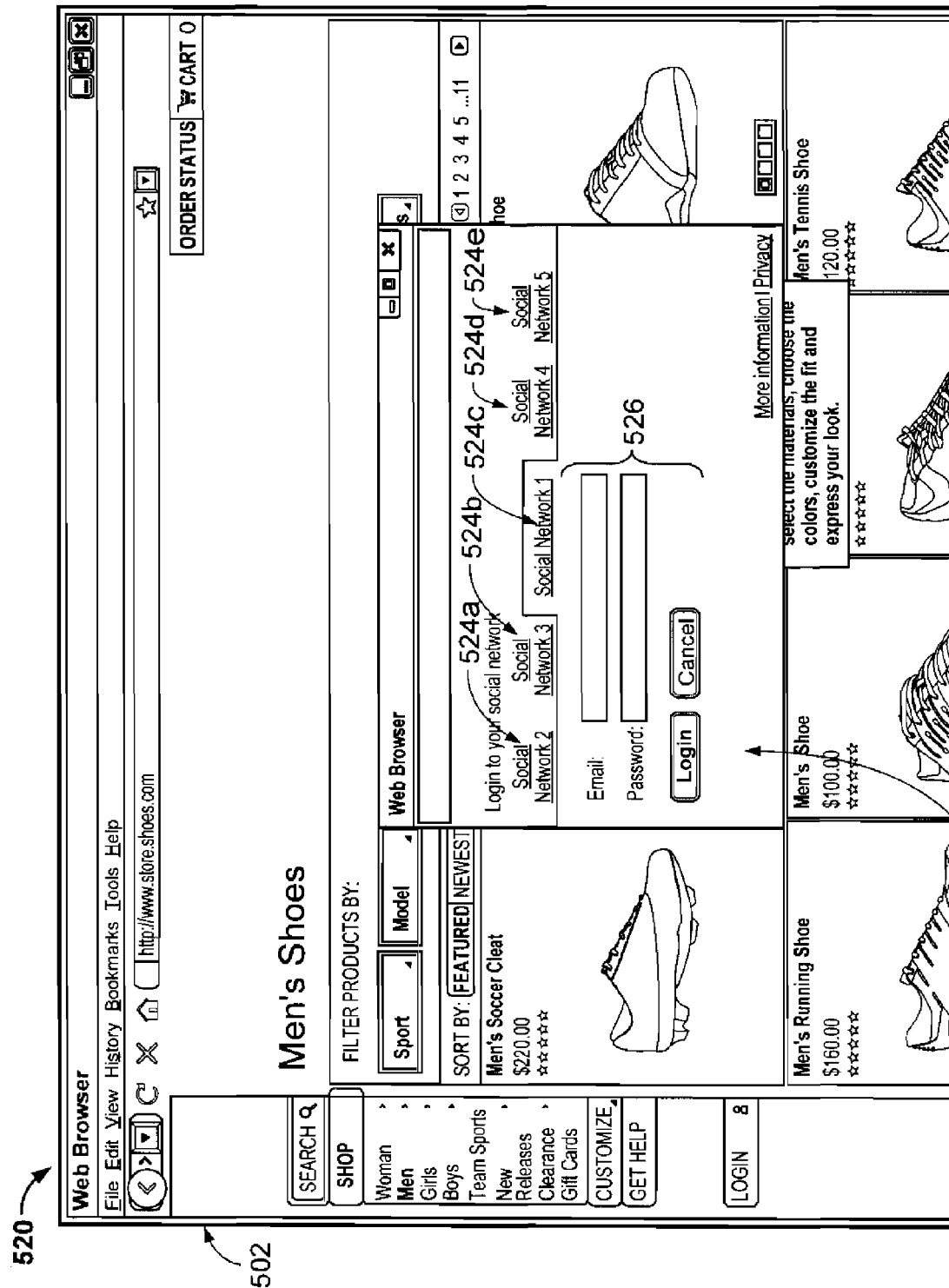

FIG. 5B depicts a screenshot 520 of the example website 502 after a user has clicked on the link 506. In the screenshot 520, a user is presented with an interface 522 to verify (e.g., authenticate) the user's identity using login fields 526 on any one of multiple social networks 524*a-e*.

Figure 5C:
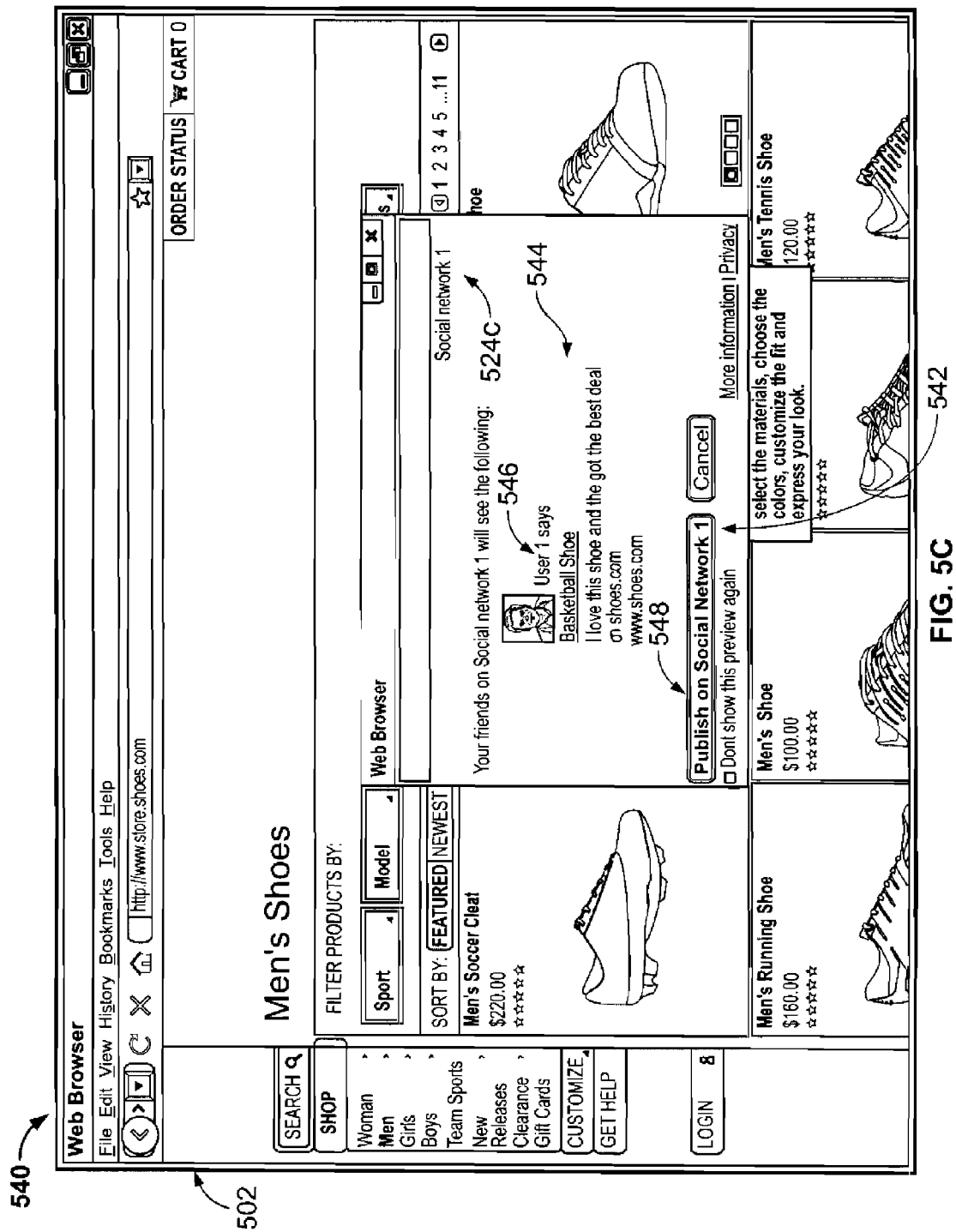

FIG. 5C depicts a screenshot 540 of the example website 502 after the user has verified his/her identity on the social network 524*c*. In the screenshot 540, the user is presented with an interface 542 to preview promotional information 544 that will be displayed to other users (e.g., other users having an acquaintance relationship with the user) on the social network 524*c*. The preview of the promotional information 544 includes an endorsement 546 of the shoe 504*c* by the user. The user is asked to confirm 548 (e.g., by clicking on a button indicating confirmation) that he/she wishes to publish the promotional information 544 on the social network 524*c* before the promotional information 544 is propagated to other users.

Figure 5D:
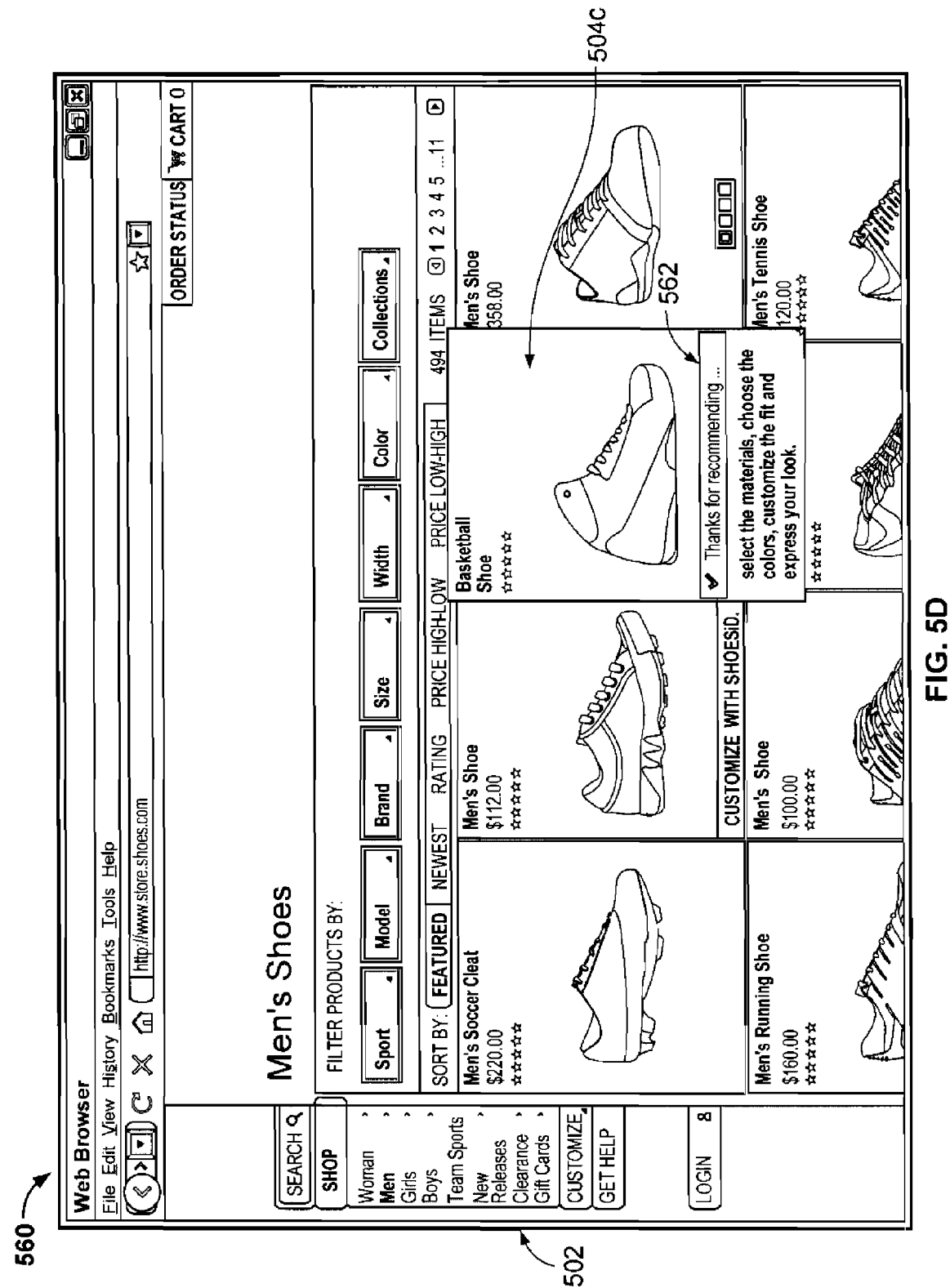

FIG. 5D depicts a screenshot 560 of the example website 502 after the user has confirmed that he/she wants the promotional information 544 to be displayed to other users on the social network 524*c*. The user is presented with confirmation 562 that the promotional information 544 recommending the shoe 504*c* was properly received.

Figure 5E:
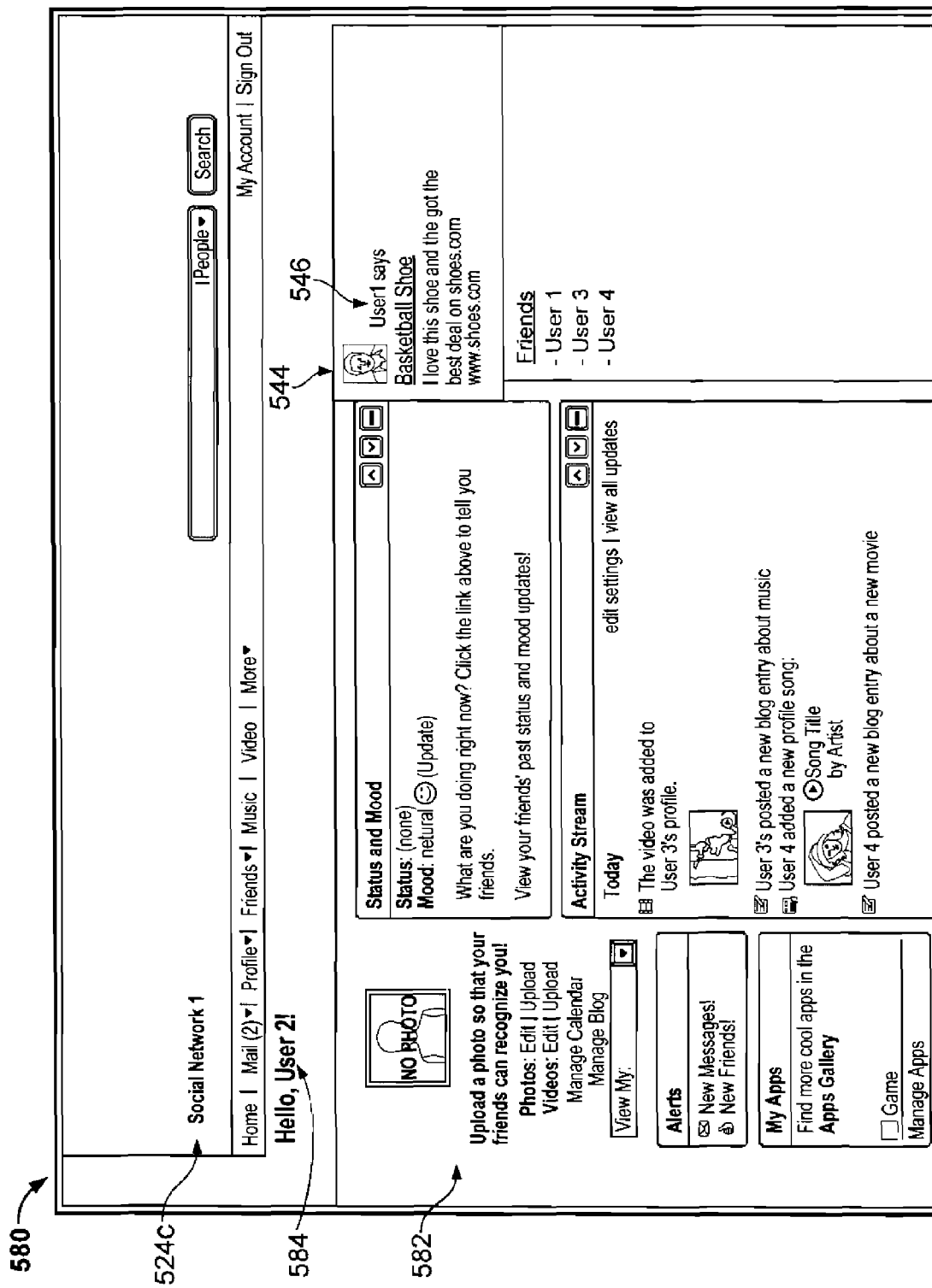

FIG. 5E depicts a screenshot 580 of an example profile page 582 on the social network 524*c* of another user 584 that has an acquaintance relationship with the recommending user. The screenshot 580 depicts the profile page 582 after the promotional information 544 has been created. As depicted, the promotional information 544 is displayed in a prominent location near the top of the profile page 582. The promotional information 544 is presented with the endorsement 546 of the shoe 504*c* by the recommending user.

Figure 6:
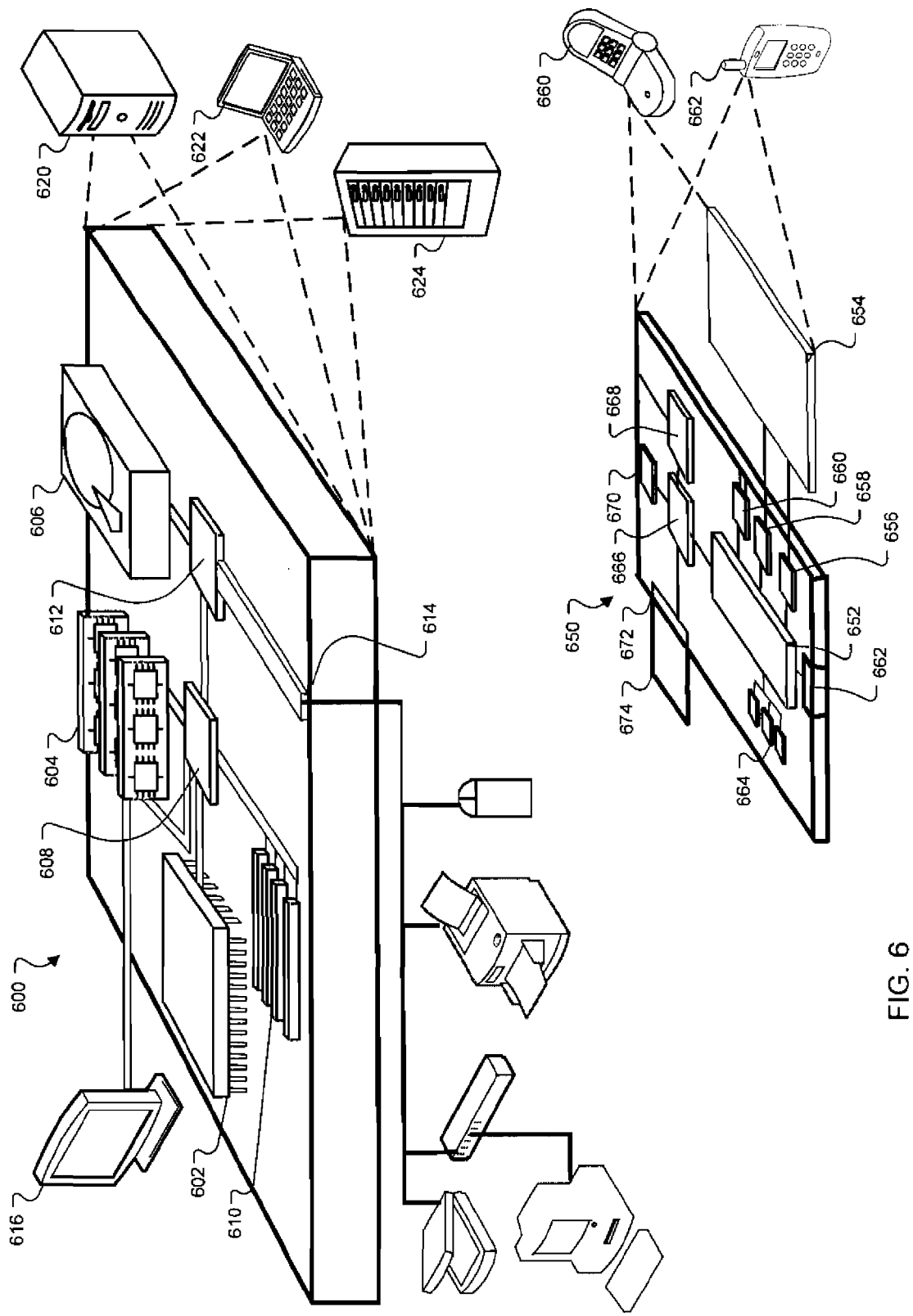
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for creating and propagating promotional information to users of a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for providing information to computer users, the method comprising:
receiving a promotional information template from a third-party server, wherein the promotional information template includes predetermined content and a placeholder for content associated with a user of any social network from a plurality of social networks;
receiving, at a server system, an indicator of an action performed on the third-party website by a first user at a first time, wherein the third-party website is hosted by a third-party server system that is separate from the server system;

creating, by the server system, first promotional information based upon the received indicator from the third-party website using the received promotional template and information associated with the first user;

receiving, from an entity associated with the promotional information, screening criteria for a promotion associated with the first promotional information;

identifying a plurality of social networks of which the first user is a member;

creating a pre-association between the first promotional information, the plurality of social networks associated with the first user and user identity information for the first user in the plurality of social networks and the screening criteria including persistently storing the pre-association, by the server system in a repository of promotional information, the pre-association being created without interaction of the created first promotional information by the first user, the pre-association including storing the created first promotional information in association with social network identifiers for the plurality of social networks and with user identifiers for the first user on the plurality of social networks, wherein the created first promotional information is added to a group of promotional information that is stored in the repository and associated with a plurality of third-party websites for display to users of a group of social networks that includes the plurality of social networks;

receiving, at the server system and from a computing device that is associated with a second user, a request for promotional information to display to the second user who is a member of a first social network that is among the plurality of social networks associated with the first user, wherein the request is received at a later second time;

determining, in response to receiving the request and by the server system, whether to select the created first promotional information from among the group of promotional information for presentation to the second user based, at least in part, on whether a first identifier for the first social network is included in the social network identifiers for the plurality of social networks that are associated with the first promotional information, whether the second user meets the screening criteria, and whether there is an acquaintance relationship between the first user and the second user, wherein acquaintance relationships are defined in a database having information that is available to the server system; and transmitting, by the server system and based on the determining, the created first promotional information for display to the second user of the first social network;

wherein the third-party website is thereby enabled to create and display promotional information on the plurality of social networks based upon user activity on the third-party website without having to directly interface with any of the social networks.

2. The method of claim 1, further comprising identifying by the server system a promotional information template from a plurality of promotional information templates based on the received indicator to be used to create the first promotional information, wherein the promotional information template includes predetermined content and a placeholder for content associated with a user of any social network from the group of social networks.

3. The method of claim 2, wherein the first promotional information is created from the identified promotional information template by replacing the placeholder with information related to the first user.

4. The method of claim 1, further comprising determining, based on information provided by the third-party server system, a length of time for which the first promotional information is to be persistently stored.

5. The method of claim 1, wherein the first promotional information comprises an advertisement.

6. The method of claim 1, wherein the first promotional information contains an endorsement by the first user relating to content on the third-party website.

7. The method of claim 6, wherein the endorsement pertains to a product displayed on the third-party website.

8. The method of claim 1, wherein the created first promotional information has fixed dimensions and wherein the created first promotional information is displayed to the second user in a predetermined area of the second user's viewing pane of a social network web page, wherein the predetermined area has a fixed size.

9. The method of claim 1, further comprising receiving, at the server system, a bid from the third-party server for an opportunity to display the first promotional information to a user of any social network from the group of social networks.

10. The method of claim 9, wherein determining whether to select the created first promotional information for presentation to the second user is additionally based upon a bid regarding the first promotional information received from the third-party server.

11. The method of claim 1, further comprising receiving, at the server system and from the third-party server system, criteria for displaying the first promotional information to a user of a social network, wherein the criteria pertain to characteristics associated with a user of a social network.

12. The method of claim 11, wherein determining whether to select the created first promotional information for presentation to the second user is additionally based upon whether the second user satisfies the criteria specified by the third-party server system.

13. The method of claim 1, further comprising:

receiving, at the server system, a second request for promotional information to display to a third user who is a member of a second social network;

determining, by the server system, whether to select the created first promotional information for presentation to the third user based, at least in part, on i) whether a second identifier for the second social network is included in the social network identifiers for the plurality of social networks that are associated with the first promotional information and ii) whether there is an acquaintance relationship between the first user and the third user; and transmitting, by the server system and based on the determining, the created first promotional information for display to the third user.

14. A system for propagating promotional information to users of a social network based upon user activity on a third-party website, the system comprising:

one or more servers;

an interface to the one or more servers i) to receive an indicator of an action performed at a first time on a third-party website by a first user and receiving, from an entity associated with the promotional information, screening criteria for a promotion, and ii) to receive, from a computing device that is associated with a second user, a request at a later second time for promotional information to display to the second user who is a member of a first social network, and to transmit promotional information for display to the second user;

a processor to access and execute a stored promotional information creation component to receive a promotional information template from the third-party server, wherein the promotional information template includes predetermined content and a placeholder for content associated with a user of any social network from a plurality of social networks, and to create first promotional information associated with the first promotion based upon the received indicator from the third-party website using the received promotional template and information associated with the first user, wherein the created first promotional information has fixed dimensions, the processor further being programmed to identify a plurality of social networks of which the first user is a member and create a pre-association between the first promotional information, the plurality of social networks associated with the first user, the screening criteria and user identity information for the first user in the plurality of social networks, the pre-association being created without interaction of the created first promotional information by the first user;

a repository to persistently store the pre-association including storing the created first promotional information as part of a group of promotional information, the first promotional information being stored in association with social network identifiers for the plurality of social networks, the screening criteria, and with user identifiers for the first user on the plurality of social networks, wherein the repository stores the group of promotional information in association with a plurality of third-party websites for display to users of a group of social networks that includes the plurality of social networks; and a request processing component to, in response to the request for promotional information received at the later second time, determine whether to select the created first promotional information from among the group of promotional information for presentation to the second user based, at least in part, on whether a first identifier for the first social network is included in the social network identifiers for the plurality of social networks that are associated with the first promotional information, whether the second user meets the screening criteria, and whether there is an acquaintance relationship between the first user and the second user, wherein the created first promotional information is displayed to the second user in a predetermined area of the second user's viewing pane of a social network web page, wherein the predetermined area has a fixed size;

wherein the third-party website is thereby enabled to create and display promotional information on the plurality of social networks based upon user activity on the third-party website without having to directly interface with any of the social networks.

15. The system of claim 14, further comprising a template repository to store promotional information templates received from third-party websites;

wherein the request processing component identifies a promotional information template from the template repository based on the received indicator, the identified promotional information template including predetermined content and a placeholder for content associated with a user of any social network from the group of social networks;

wherein the request processing component creates the first promotional information from the identified promotional information template by replacing the placeholder with information related to the first user of the social network.

16. The system of claim 14, wherein the interface further receives a bid from the third-party server for an opportunity to display the first promotional information to a user of any social network from the group of social networks.

17. The system of claim 16, wherein the request processing component determines whether to select the created first promotional information for presentation to the second user additionally based upon the bid regarding the first promotional information received from the third-party server.

18. A system for propagating promotional information to users of a social network based upon user activity on a third-party website, the system comprising:

one or more servers;

an interface to the one or more servers i) to receive an indicator of an action performed at a first time on a third-party website by a first user and receiving, from an entity associated with the promotional information, screening criteria for a promotion, and ii) to receive, from a computing device that is associated with a second user, a request at a later second time for promotional information to display to the second user who is a member of a first social network, and to transmit promotional information for display to the second user;

a processor to access and execute a stored promotional information creation component to receive a promotional information template from the third-party server, wherein the promotional information template includes predetermined content and a placeholder for content associated with a user of any social network from a plurality of social networks, and to create first promotional information associated with the promotion based upon the received indicator from the third-party website using the received promotional template and information associated with the first user, wherein the created first promotional information has fixed dimensions, the processor further being programmed to identify a plurality of social networks of which the first user is a member and create a pre-association between the first promotional information, the screening criteria, the plurality of social networks associated with the first user and user identity information for the first user in the plurality of social networks, the pre-association being created without interaction of the created first promotional information by the first user;

a repository to persistently store the pre-association including storing the created first promotional information as part of a group of promotional information, the first promotional information being stored in association with social network identifiers for the plurality of social networks, the screening criteria and with user identifiers for the first user on the plurality of social networks, wherein the repository stores the group of promotional information in association with a plurality of third-party websites for display to users of a group of social networks that includes the plurality of social networks; and means for processing the request for promotional information received at the later second time by determining whether to select the created first promotional information from among the group of promotional information for presentation to the second user based, at least in part, on whether a first identifier for the first social network is included in the social network identifiers for the plurality of social networks that are associated with the first promotional information, whether the second user meets the screening criteria, and ] whether there is an acquaintance relationship between the first user and the second user, wherein the created first promotional information is displayed to the second user in a predetermined area of the second user's viewing pane of a social network web page, wherein the predetermined area has a fixed size;

wherein the third-party website is thereby enabled to create and display promotional information on the plurality of social networks based upon user activity on the third-party website without having to directly interface with any of the social networks.

19. The system of claim 18, wherein the interface further receives a bid from the third-party server for an opportunity to display the first promotional information to a user of any social network from the group of social networks.

20. The system of claim 19, wherein the means for processing the received request determines whether to select the created first promotional information for presentation to the second user additionally based upon the bid regarding the first promotional information received from the third-party server.

* * * * *